United States Patent
Subramaniam et al.

(10) Patent No.: US 11,016,963 B2
(45) Date of Patent: May 25, 2021

(54) MOBILE SEARCH

(71) Applicant: Groupon, Inc., Chicago, IL (US)

(72) Inventors: Sri Subramaniam, San Jose, CA (US); Sebastian Heycke, San Francisco, CA (US); Kevin Sze Tsun Tsoi, Chicago, IL (US); William Breetz, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 312 days.

(21) Appl. No.: 15/167,604

(22) Filed: May 27, 2016

(65) Prior Publication Data

US 2016/0350365 A1    Dec. 1, 2016

Related U.S. Application Data

(60) Provisional application No. 62/168,560, filed on May 29, 2015.

(51) Int. Cl.
*G06F 16/242*  (2019.01)
*G06F 16/248*  (2019.01)
(Continued)

(52) U.S. Cl.
CPC ........ *G06F 16/2423* (2019.01); *G06F 16/248* (2019.01); *G06F 16/24578* (2019.01); *G06Q 30/0277* (2013.01)

(58) Field of Classification Search
CPC ........... G06F 17/30392; G06F 17/3053; G06F 17/30554; G06F 16/2423; G06F 16/248;
(Continued)

(56) References Cited

U.S. PATENT DOCUMENTS 5,349,356 A * 9/1994 Camiade ................. G01S 7/024
342/188
5,390,609 A * 2/1995 McKee .................. B60N 3/002
108/45
(Continued)

FOREIGN PATENT DOCUMENTS

WO    2016/196227 A1    12/2016

OTHER PUBLICATIONS

PCT International Preliminary Report on Patentability for application PCT/US2016/034469 dated Dec. 5, 2017.
(Continued)

*Primary Examiner* — Neveen Abel Jalil
*Assistant Examiner* — Hubert Cheung
(74) *Attorney, Agent, or Firm* — Alston & Bird LLP

(57) ABSTRACT

Techniques for providing consumer device interfaces are discussed herein. Some embodiments may include a system, including processing circuitry configured to: connect with a consumer device via a network; provide a search interface to the consumer device; receive one or more search parameters from the consumer device via the network; determine card scores for candidate cards based on the one or more search parameters, wherein each card includes an electronic marketing message indicating one or more items; determine a card score ranking based on the card scores; determine whether the consumer device is a mobile device; and in response to determining that the consumer device is a mobile device: determine mobile card layout; generate a mobile interface based on the mobile card layout; and provide one or more of the candidate cards to the mobile interface based on the card score ranking and the mobile card layout.

28 Claims, 27 Drawing Sheets

(51) Int. Cl.
*G06F 16/2457* (2019.01)
*G06Q 30/02* (2012.01)

(58) Field of Classification Search
CPC .......... G06F 16/24578; G06Q 30/0277; G06Q 10/10; G06Q 10/0838; G06Q 10/087; B60G 2600/1876; B60G 2600/1877; B60G 2600/1878; B60G 2600/1879
See application file for complete search history.

(56) References Cited

U.S. PATENT DOCUMENTS

| | | | | |
|---|---|---|---|---|
| 5,534,857 A * | 7/1996 | Laing | ................ | G06K 17/0022 340/5.74 |
| 5,604,787 A * | 2/1997 | Kotzin | ................ | G06Q 20/346 379/357.01 |
| 5,696,908 A * | 12/1997 | Muehlberger | ......... | G06Q 20/00 235/380 |
| 5,796,832 A * | 8/1998 | Kawan | ................ | G06Q 20/18 705/65 |
| 5,890,074 A * | 3/1999 | Rydbeck | ................ | H04B 1/38 455/321 |
| 5,905,947 A * | 5/1999 | Stein | ................ | H04B 1/088 455/90.3 |
| 5,928,347 A * | 7/1999 | Jones | ................ | G06F 13/385 710/305 |
| 5,963,872 A * | 10/1999 | Stein | ................ | H04B 1/088 455/557 |
| 6,016,432 A * | 1/2000 | Stein | ................ | G11B 31/00 455/557 |
| 6,067,529 A * | 5/2000 | Ray | ................ | G06Q 20/047 705/24 |
| 6,212,555 B1 * | 4/2001 | Brooks, Jr. | ............ | G06Q 30/02 348/E7.071 |
| 6,332,133 B1 * | 12/2001 | Takayama | ............ | G06Q 20/04 235/380 |
| 6,456,984 B1 * | 9/2002 | Demoff | ................ | G06Q 20/02 705/38 |
| 6,707,894 B1 * | 3/2004 | Halford | ................ | G06Q 20/102 379/114.16 |
| 6,771,981 B1 * | 8/2004 | Zalewski | ................ | B67D 7/145 455/557 |
| 6,868,391 B1 * | 3/2005 | Hultgren | ................ | G06Q 20/02 705/17 |
| 6,915,272 B1 * | 6/2005 | Zilliacus | ................ | G06Q 20/02 705/26.8 |
| 7,013,476 B2 * | 3/2006 | Volk | ................ | G11B 23/0308 720/726 |
| 7,058,959 B2 * | 6/2006 | Volk | ................ | G11B 25/043 369/30.63 |
| 7,068,995 B1 * | 6/2006 | Geddes | ................ | G06Q 20/102 455/406 |
| 7,079,832 B2 * | 7/2006 | Zalewski | ................ | G06Q 20/06 455/405 |
| 7,103,572 B1 * | 9/2006 | Kawaguchi | ............ | G06Q 20/04 705/39 |
| 7,107,248 B1 * | 9/2006 | Asokan | ................ | G06Q 20/3821 705/67 |
| 7,139,694 B2 * | 11/2006 | Horn | ................ | G06Q 20/04 705/64 |
| 7,152,782 B2 * | 12/2006 | Shenker | ............ | G06Q 20/327 235/376 |
| 7,155,199 B2 * | 12/2006 | Zalewski | ................ | G06Q 20/322 455/403 |
| 7,177,837 B2 * | 2/2007 | Pegaz-Paquet | ........ | G06Q 20/04 705/35 |
| 7,213,742 B1 * | 5/2007 | Birch | ................ | G06Q 30/0207 235/375 |
| 7,228,155 B2 * | 6/2007 | Saunders | ............... | G06Q 20/20 379/114.19 |
| 7,275,685 B2 * | 10/2007 | Gray | ...................... | G06Q 20/24 235/380 |
| 7,308,431 B2 * | 12/2007 | Asokan | ................ | G06Q 20/02 705/67 |
| 7,341,182 B2 * | 3/2008 | Lai | ...................... | G06Q 20/3226 235/380 |
| 7,343,344 B2 * | 3/2008 | Tomoike | ................ | G06Q 20/04 705/16 |
| 7,349,871 B2 * | 3/2008 | Labrou | ................ | G06Q 20/02 705/26.35 |
| 7,370,012 B2 * | 5/2008 | Karns | .................... | G06Q 20/10 705/39 |
| 7,493,288 B2 * | 2/2009 | Biship | ............. | G06K 19/07749 705/50 |
| 7,512,567 B2 * | 3/2009 | Bemmel | ................... | H04L 9/32 705/67 |
| 7,590,992 B2 * | 9/2009 | Koplar | .............. | G06K 19/07703 725/19 |
| 7,611,054 B2 * | 11/2009 | Bortolin | ............... | G06Q 20/346 235/375 |
| 7,641,111 B2 * | 1/2010 | Adams | ................ | G06Q 50/265 235/380 |
| 7,729,690 B1 * | 6/2010 | Huang | ............. | H04M 1/72403 455/419 |
| 7,729,986 B1 * | 6/2010 | Hoffman | .............. | G06Q 20/341 705/41 |
| 9,152,675 B2 * | 10/2015 | Faller | ...................... | H04L 51/32 |
| 9,785,678 B1 * | 10/2017 | Peery | ................ | G06F 17/3053 |
| 10,229,439 B1 * | 3/2019 | Wang | ................ | G06Q 30/0275 |
| 10,268,730 B2 * | 4/2019 | Kowalski | .......... | G06F 16/24578 |
| 2002/0156680 A1 * | 10/2002 | Casserly | ................ | G06Q 10/087 705/14.41 |
| 2004/0100510 A1 * | 5/2004 | Milic-Frayling | ........ | G06F 17/30905 715/864 |
| 2006/0190330 A1 * | 8/2006 | Tollinger | .............. | G06F 17/212 705/14.14 |
| 2007/0143345 A1 * | 6/2007 | Jones | ................ | G06F 16/444 |
| 2008/0215428 A1 * | 9/2008 | Ramer | ................ | G06Q 30/02 705/14.53 |
| 2012/0084277 A1 * | 4/2012 | Barve | .............. | G06F 17/30864 707/708 |
| 2012/0278342 A1 * | 11/2012 | Purdy | ................. | G11B 27/105 707/749 |
| 2012/0290447 A1 * | 11/2012 | Hershenson | ....... | G06Q 30/0277 705/27.2 |
| 2013/0144870 A1 * | 6/2013 | Gupta | ................... | G06F 16/951 707/726 |
| 2014/0067556 A1 | 3/2014 | Burt et al. | | |
| 2014/0372218 A1 | 12/2014 | Talluri et al. | | |
| 2015/0278212 A1 * | 10/2015 | Krueppel-Berndt | ........ | G06F 17/3053 707/728 |

OTHER PUBLICATIONS

PCT International Search Report and Written Opinion of the International Searching Authority for application PCT/US2016/034469 dated Aug. 19, 2016.
U.S. Appl. No. 62/140,957, filed Mar. 31, 2015.
U.S. Appl. No. 15/085,849, filed Mar. 30, 2016.
U.S. Appl. No. 62/019,214, filed Jun. 30, 2014.
Extended European Search Report for corresponding European Application No. 16804078.0 dated Sep. 19, 2018, 7 pages.
Office Action for European Application No. 16804078.0 dated Feb. 20, 2020, 6 pages.
Office Action for Australian Application No. 2016271110 dated Jul. 30, 2020.

* cited by examiner

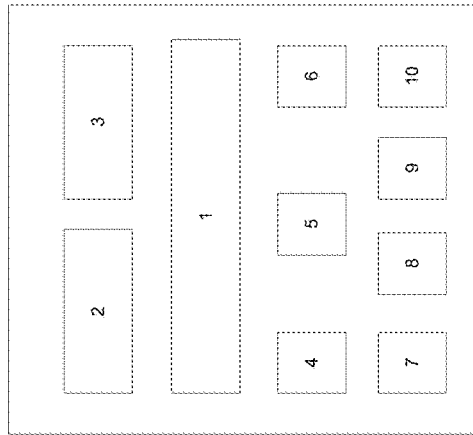
FIG. 7a
FIG. 7b
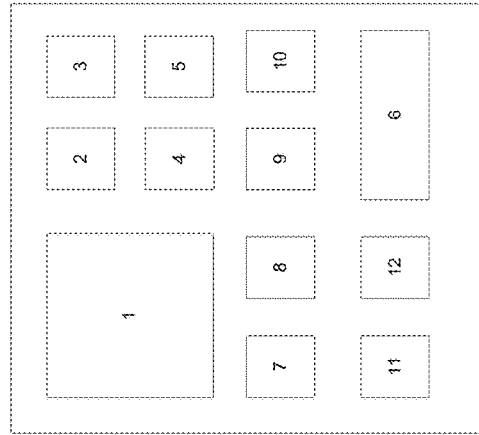
FIG. 7c
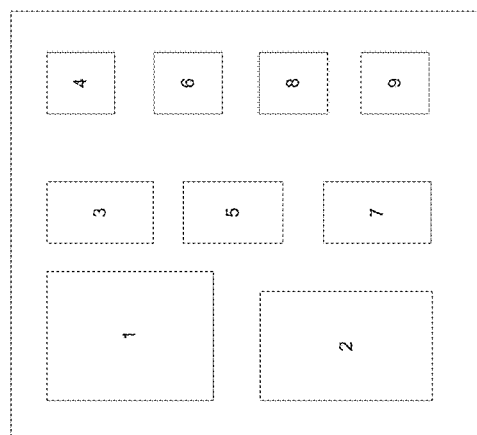
FIG. 7d

1300

MOBILE SEARCH

CROSS-REFERENCE TO RELATED APPLICATIONS

This application claims the benefit of U.S. Provisional Patent Application No. 62/168,560, titled "Mobile Search," filed May 29, 2015, which is incorporated by reference herein in its entirety.

FIELD

Embodiments of the invention relate, generally, to techniques for providing electronic interfaces to consumer devices over a network.

BACKGROUND

Promotional systems provide electronic marketing communications to consumer devices. Consumers may access such electronic marketing communications using various devices, including mobile devices (e.g., mobile phone, tablet, etc.) or desktop devices (e.g., personal computer, workstation, etc.). The quality of an electronic communication, such as the ease of navigation and exploration, can vary depending on the consumer device platform used to access the electronic marketing communication. For example, interfaces that are suitable for higher resolution desktop screens may be difficult to view or navigate using a smaller mobile device with a built in touchscreen. In addition to size differences, the format, content (e.g., programmatic selection of various items based on search parameters and/or consumer preferences), and behavior (e.g., navigation, menus, search interfaces, etc.) of an electronic marketing communication interface optimized for desktop use may be unsuitable for mobile device use, and vice versa. Inefficiencies in terms of processing and networking resources often arise from promotional systems attempting to support multiple consumer device platforms. In this regard and others as discussed herein, areas for improving current techniques have been identified.

BRIEF SUMMARY

Through applied effort, ingenuity, and innovation, solutions to improve such systems have been realized and are described herein.

Various embodiments of the present invention are directed to improved apparatuses, methods, and computer readable media. Some embodiments may include a system, including processing circuitry configured to: connect with a consumer device via a network; provide a search interface to the consumer device; receive one or more search parameters from the consumer device via the network; determine card scores for candidate cards based on the one or more search parameters, wherein each card includes an electronic marketing message indicating one or more items; determine a card score ranking based on the card scores; determine whether the consumer device is a mobile device; and in response to determining that the consumer device is a mobile device: determine mobile card layout; generate a mobile interface based on the mobile card layout; and provide one or more of the candidate cards to the mobile interface based on the card score ranking and the mobile card layout.

In some embodiments, the one or more servers may be further configured to, in response to determining that the consumer device is a mobile device: determine a plurality of mobile card layouts; and provide candidate cards to card slots of the plurality of card layouts based on the card score ranking.

In some embodiments, the one or more servers may be further configured to: receive a consumer device input indicating a vertical swipe within the mobile interface; and provide one of the plurality of mobile card layouts to the mobile interface based on the second consumer device input.

In some embodiments, the one or more servers configured to receive the one or more search parameters from the consumer device via the network may include the one or more servers being configured to receive a first consumer device input indicating a horizontal swipe within the mobile interface, the horizontal swipe defining the one or more search parameters.

In some embodiments, the one or more servers may be further configured to, in response to determining that the consumer device is a mobile device: determine a plurality of mobile card layouts; provide candidate cards to card slots of the plurality of card layouts based on the card score ranking; receive a second consumer device input indicating a vertical swipe within the mobile interface; and provide one of the plurality of mobile card layouts to the mobile interface based on the second consumer device input.

In some embodiments, the one or more servers may be further configured to: identify a consumer account and associated electronic marketing information; and determine the card scores for the candidate cards based on the electronic marketing information.

In some embodiments, the one or more search parameters may include at least one of: a search term; a location; or an item category.

In some embodiments, each candidate card includes an electronic marketing message indicating one or more items.

In some embodiments, each candidate card includes presentation data including at least one of text, image, or video data.

In some embodiments, the one or more servers may be further configured to: connect with a second consumer device via the network; identify a second consumer account and electronic marketing information associated with the second consumer device; determine second card scores for the candidate cards based on the electronic marketing information; determine a second card score ranking based on the second card scores; determine whether the second consumer device is a mobile device; and in response to determining that the second consumer device fails to be a mobile device: determine a desktop card layout; generate a desktop interface based on the desktop card layout; and provide one or more of the candidate cards to the desktop interface based on the second card score ranking and the desktop card layout.

In some embodiments, the one or more servers may be further configured to: connect with a second consumer device via the network; identify a second consumer account and associated electronic marketing information associated with the second consumer device; determine second card scores for the candidate cards based on the electronic marketing information; determine a second card score ranking based on the second card scores; determine whether the second consumer device is a mobile device; and in response to determining that the second consumer device fails to be a mobile device: determine a desktop card layout; generate a desktop interface based on the desktop card layout; and provide one or more of the candidate cards to the desktop home interface based on the card score ranking and the desktop card layout.

Some embodiments may include a method for providing a mobile interface, comprising: connecting with a consumer device via a network by one or more servers; providing, by the one or more servers, a search interface to the consumer device; receiving, by the one or more servers, one or more search parameters from the consumer device via the network; determining, by the one or more servers, card scores for candidate cards based on the one or more search parameters, wherein each card includes an electronic marketing message indicating one or more items; determining, by the one or more servers, a card score ranking based on the card scores; determine, by the one or more servers, whether the consumer device is a mobile device; and in response to determining that the consumer device is a mobile device, and by the one or more servers: determining a mobile card layout; generating a mobile interface based on the mobile card layout; and providing one or more of the candidate cards to the mobile interface based on the card score ranking and the mobile card layout.

In some embodiments, the method may further include, in response to determining that the consumer device is a mobile device, and by the one or more servers: determining a plurality of mobile card layouts; and providing candidate cards to card slots of the plurality of card layouts based on the card score ranking.

In some embodiments, the method may further include, by the one or more servers: receiving a consumer device input indicating a vertical swipe within the mobile interface; and providing one of the plurality of mobile card layouts to the mobile interface based on the second consumer device input.

In some embodiments, receiving the one or more search parameters from the consumer device via the network may include receiving a first consumer device input indicating a horizontal swipe within the mobile interface, the horizontal swipe defining the one or more search parameters.

In some embodiments, the method may further include, in response to determining that the consumer device is a mobile device: determining a plurality of mobile card layouts; providing candidate cards to card slots of the plurality of card layouts based on the card score ranking; receiving a second consumer device input indicating a vertical swipe within the mobile interface; and providing one of the plurality of mobile card layouts to the mobile interface based on the second consumer device input.

In some embodiments, the method may further include, by the one or more servers: identifying a consumer account and associated electronic marketing information; and determining the card scores for the candidate cards based on the electronic marketing information.

In some embodiments, the one or more search parameters may include at least one of: a search term; a location; or an item category.

In some embodiments, each candidate card may include an electronic marketing message indicating one or more items.

In some embodiments, each candidate card may include presentation data including at least one of text, image, or video data.

In some embodiments, the method may further include, by the one or more servers: connecting with a second consumer device via the network; identifying a second consumer account and electronic marketing information associated with the second consumer device; determining second card scores for the candidate cards based on the electronic marketing information; determining a second card score ranking based on the second card scores; determining whether the second consumer device is a mobile device; and in response to determining that the second consumer device fails to be a mobile device: determining a desktop card layout; generating a desktop interface based on the desktop card layout; and providing one or more of the candidate cards to the desktop interface based on the second card score ranking and the desktop card layout.

In some embodiments, the method may further include, by the one or more servers: identifying a second consumer account and associated electronic marketing information associated with a second consumer device; determining second card scores for the candidate cards based on the electronic marketing information; determining a second card score ranking based on the second card scores; determining whether the second consumer device is a mobile device; and in response to determining that the second consumer device fails to be a mobile device: determining a desktop card layout; generating a desktop interface based on a desktop card layout; and providing one or more of the candidate cards to the desktop interface based on the card score ranking and the desktop card layout.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
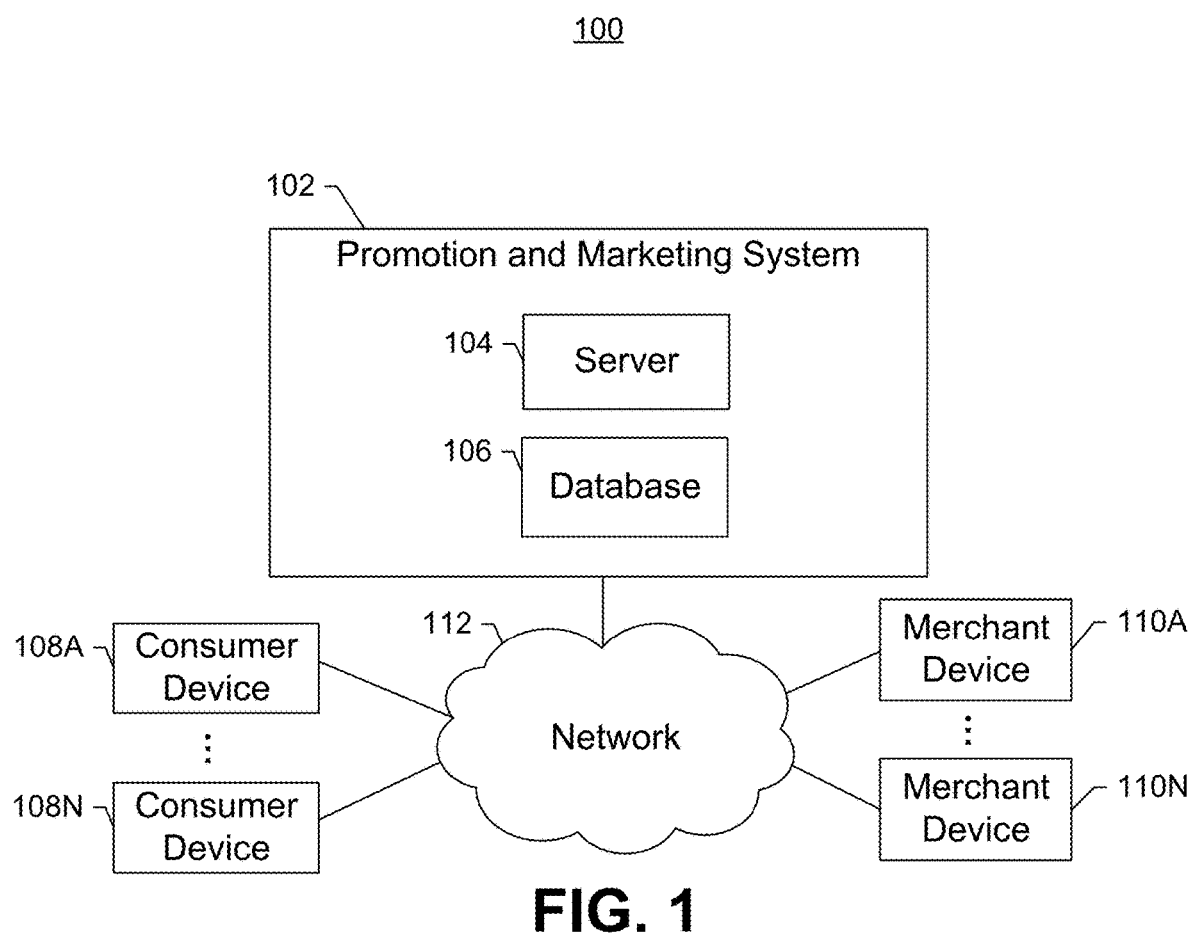
Figure 2:
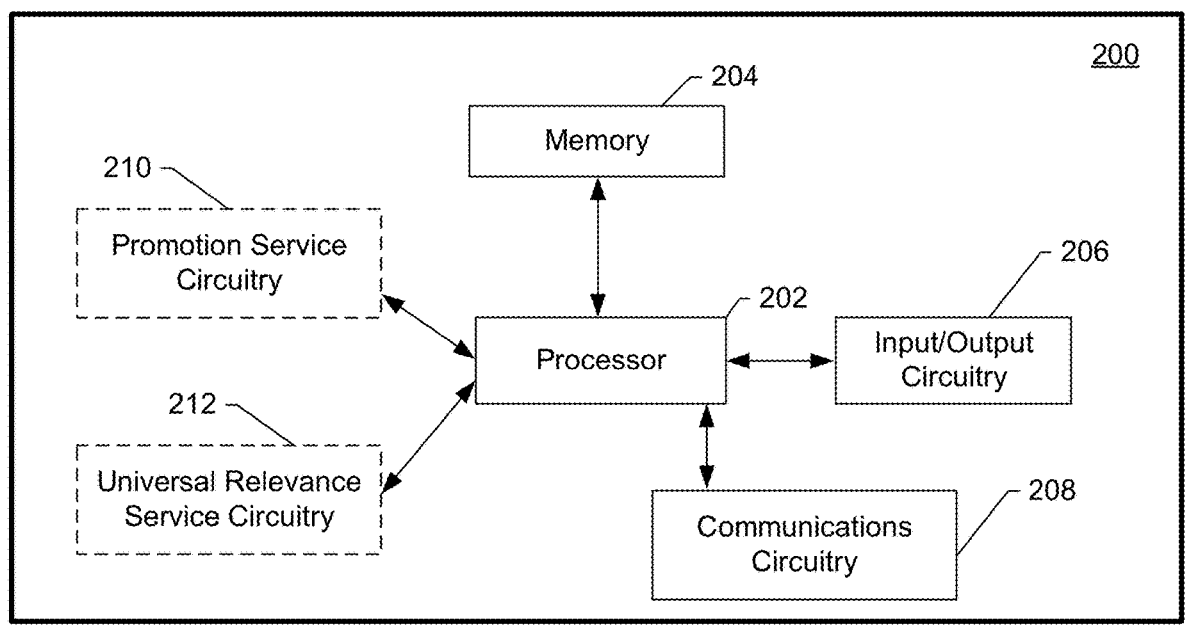
Figure 3:
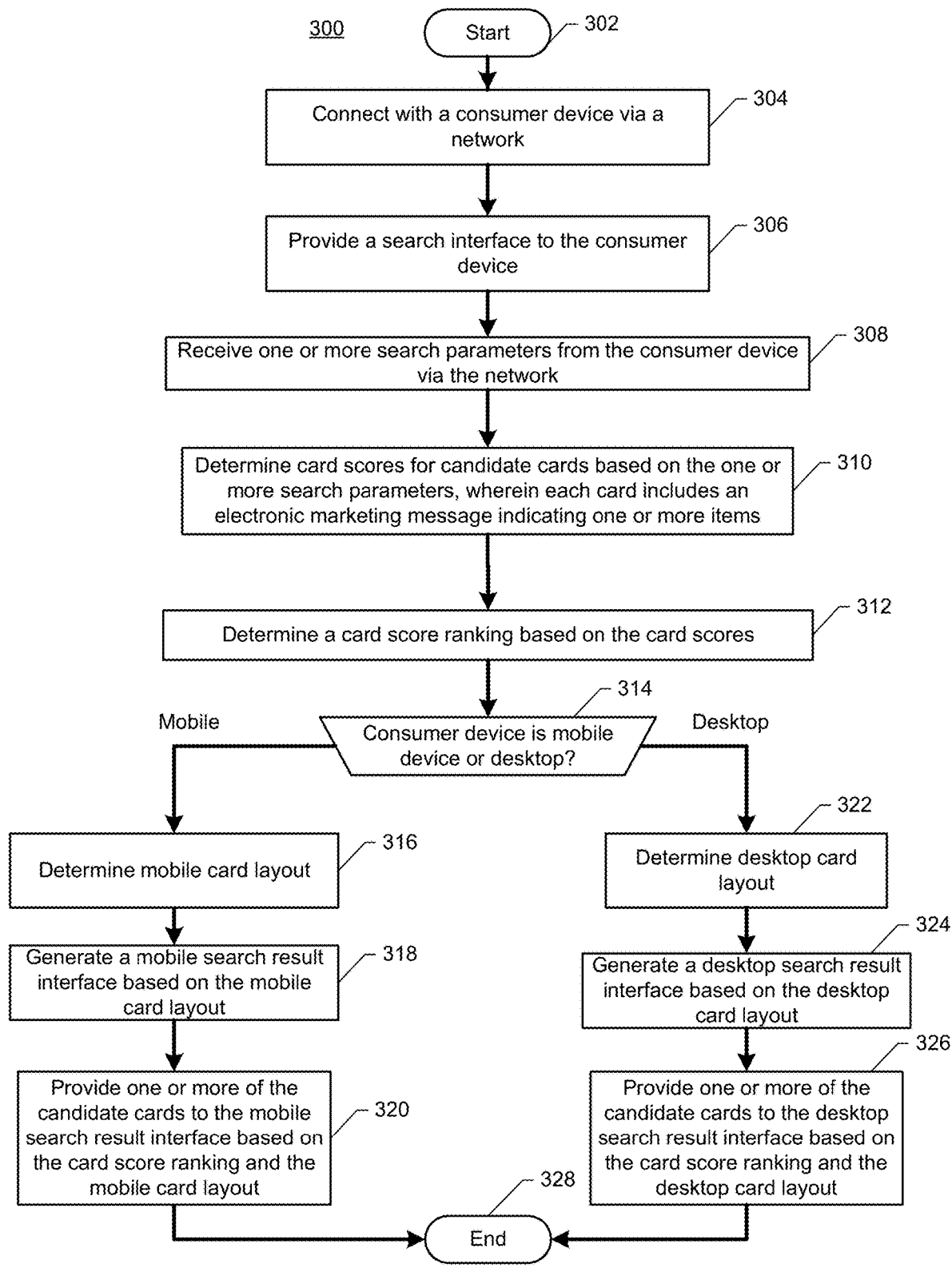
Figure 4:
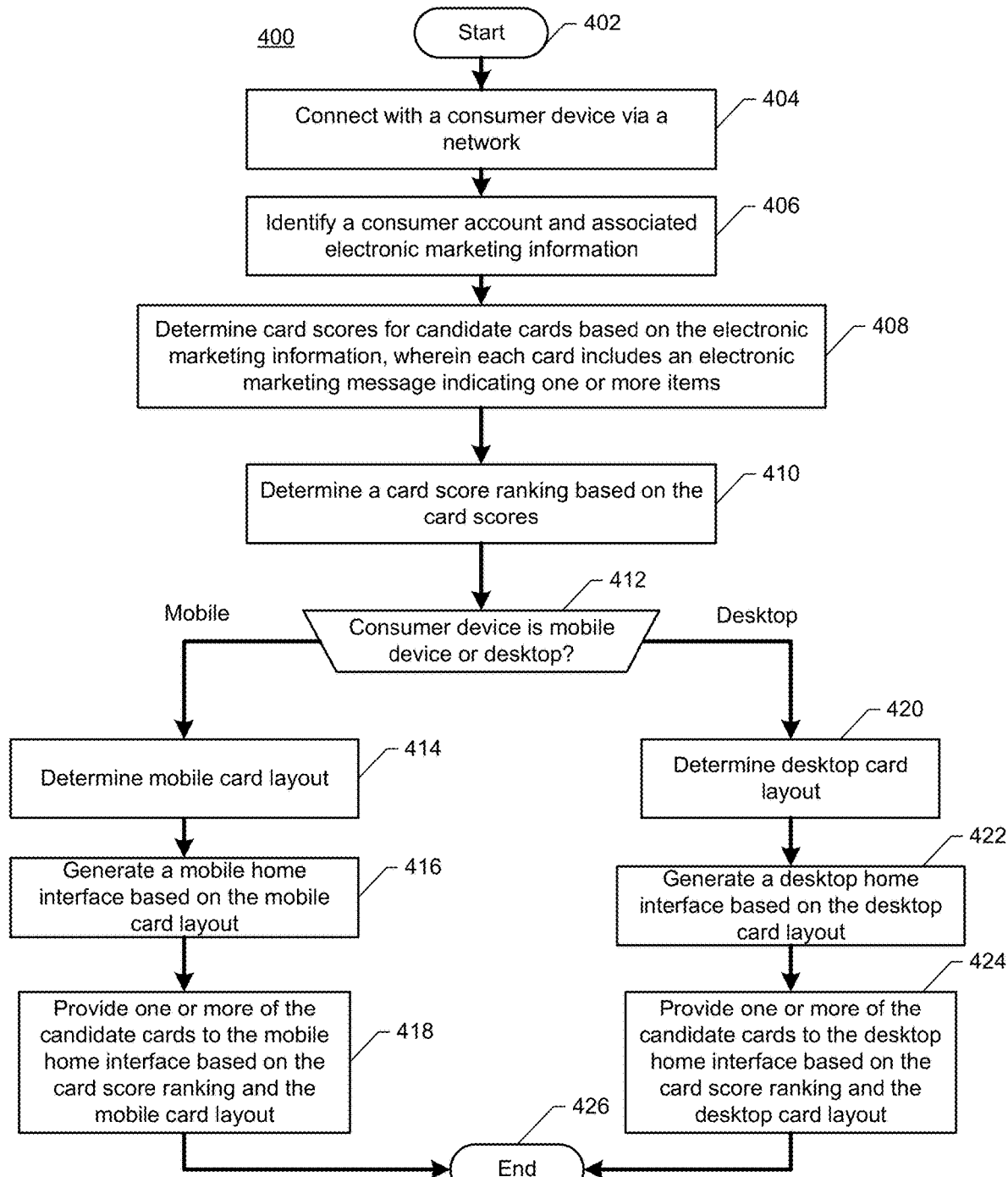
Figure 5:
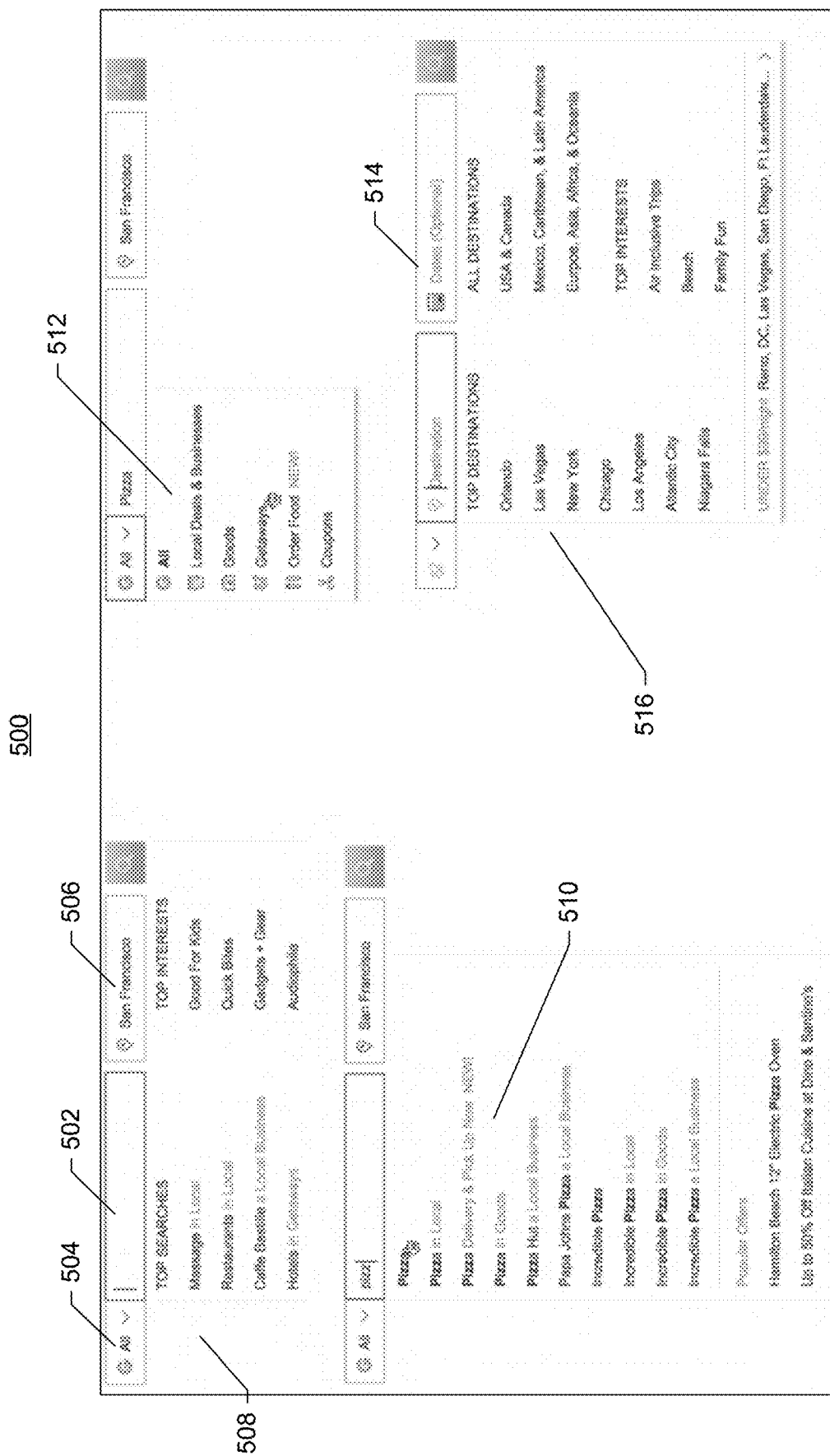
Figure 6C:
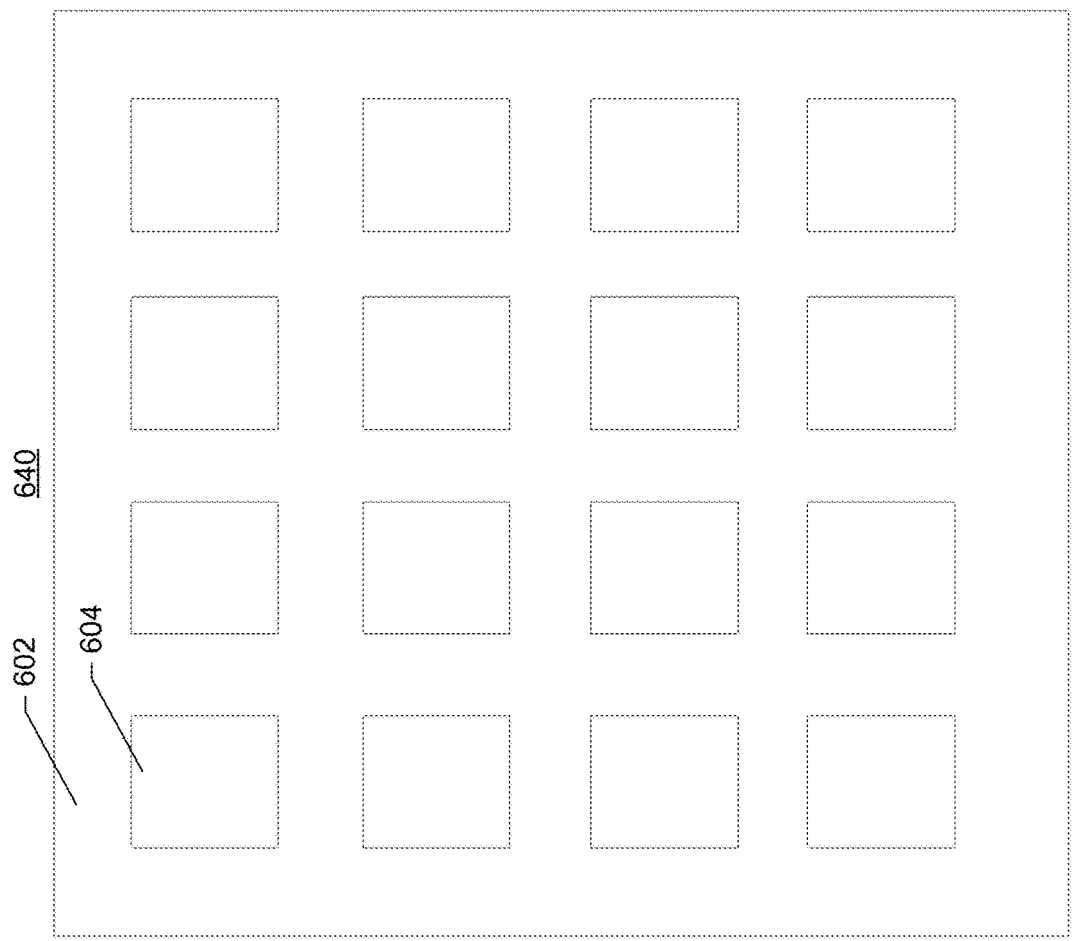
Figure 6A:
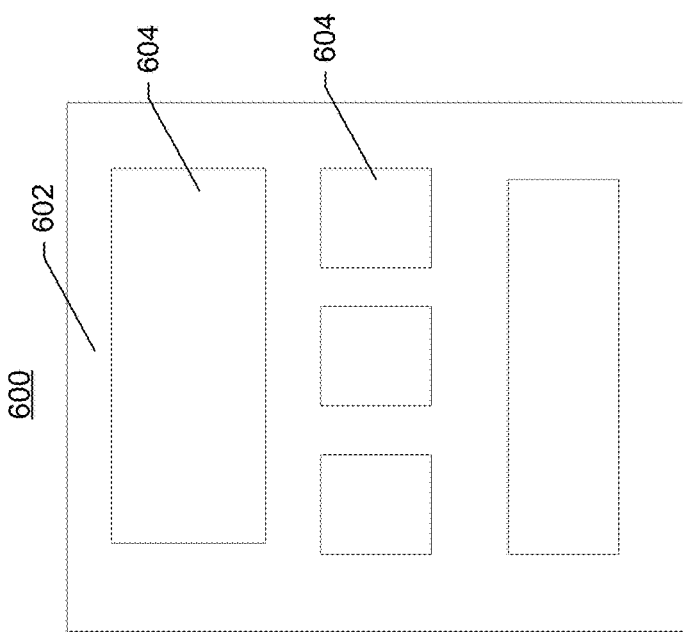
Figure 6B:
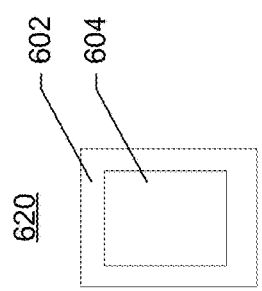
Figure 8:
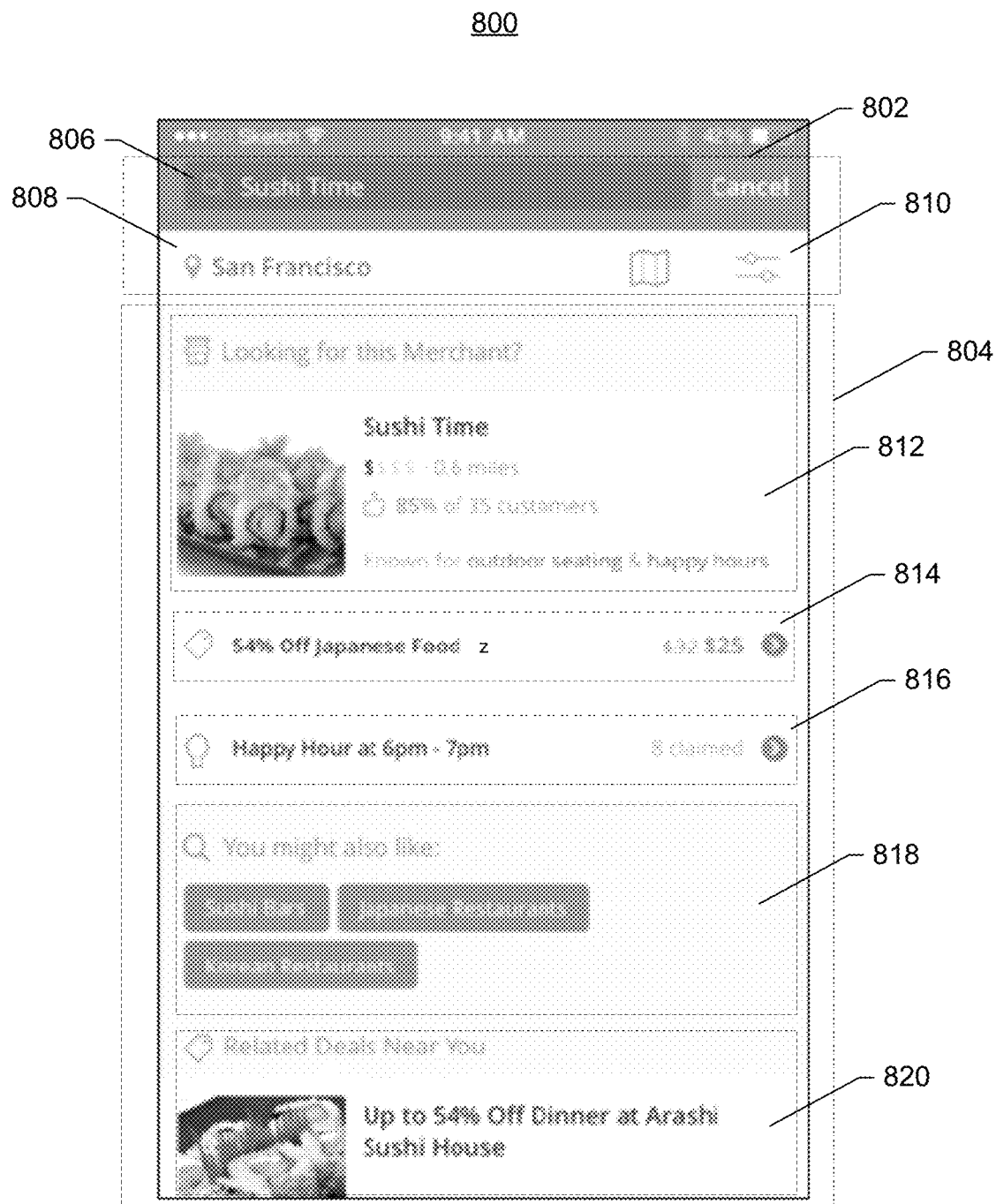
Figure 9:
Figure 10:
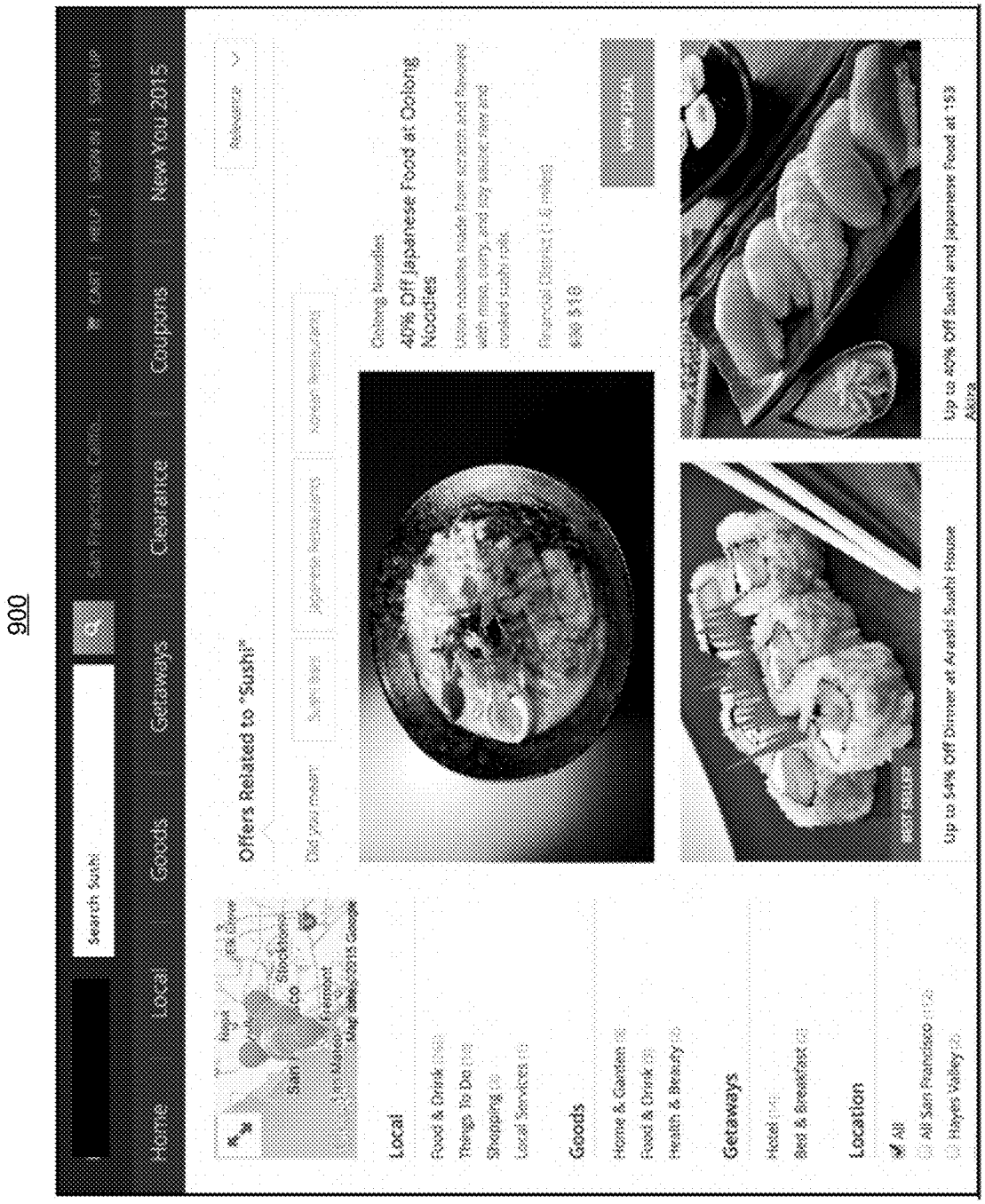
Figure 11:
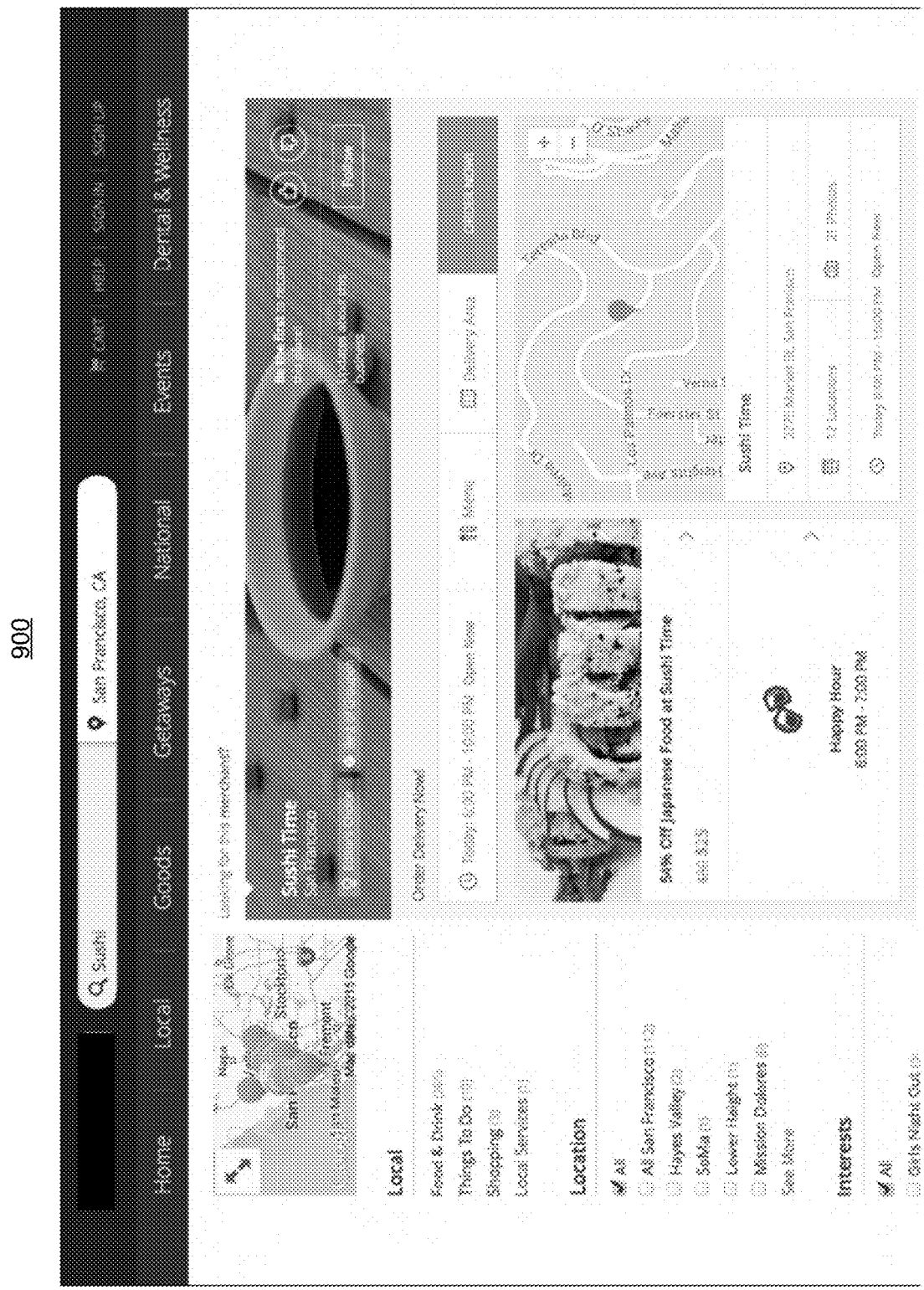
Figure 13A:
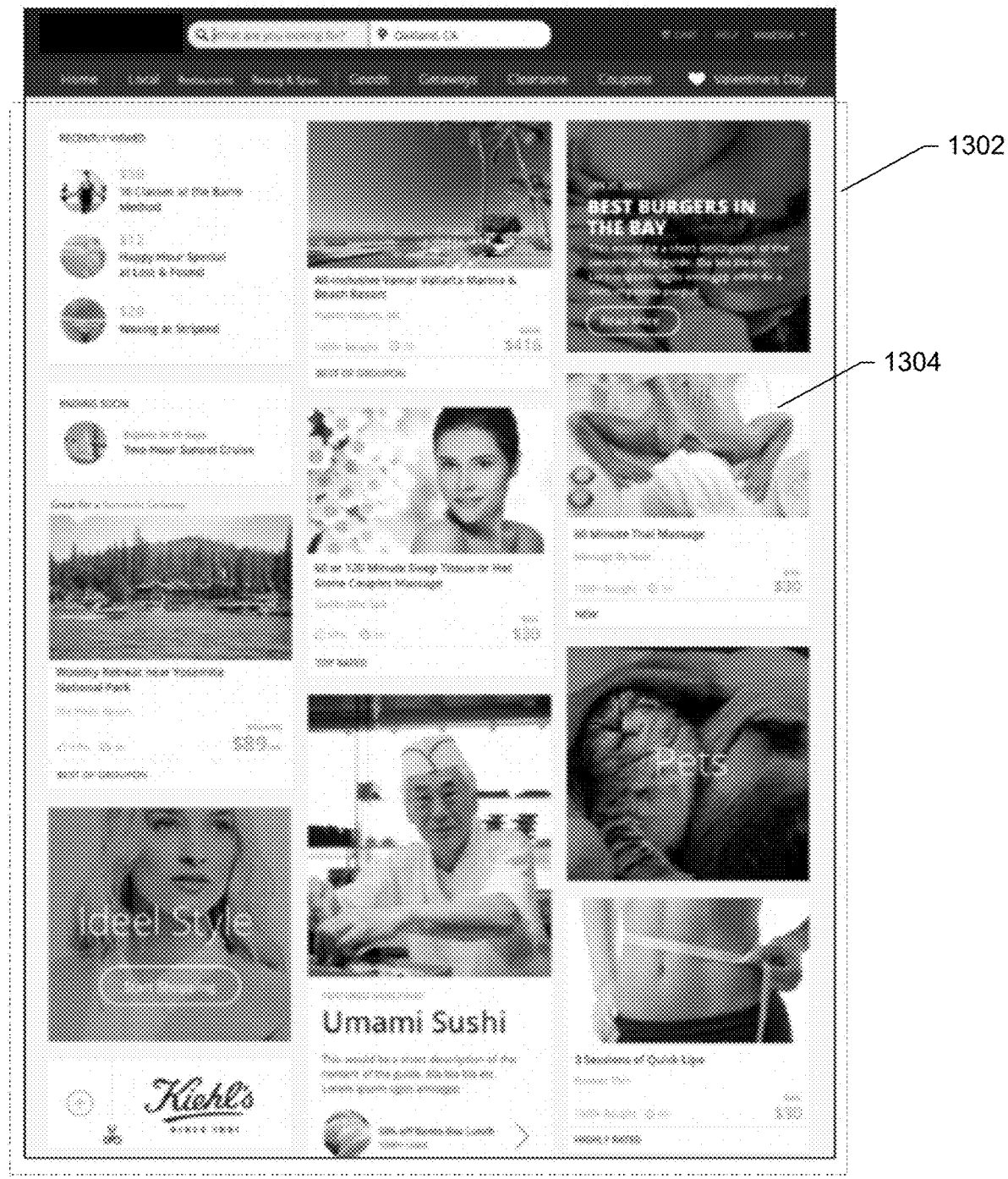
Figure 13B:
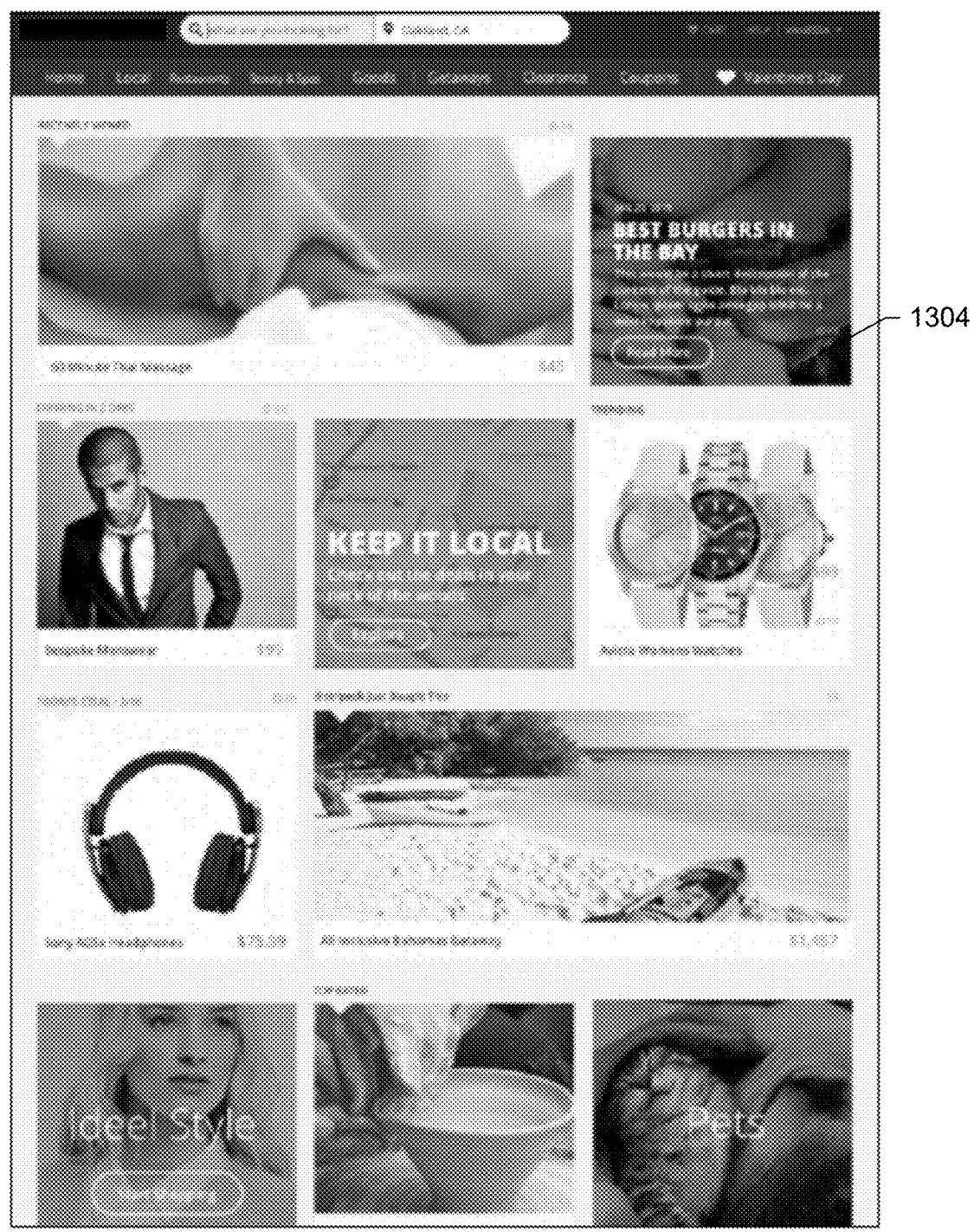
Figure 14:
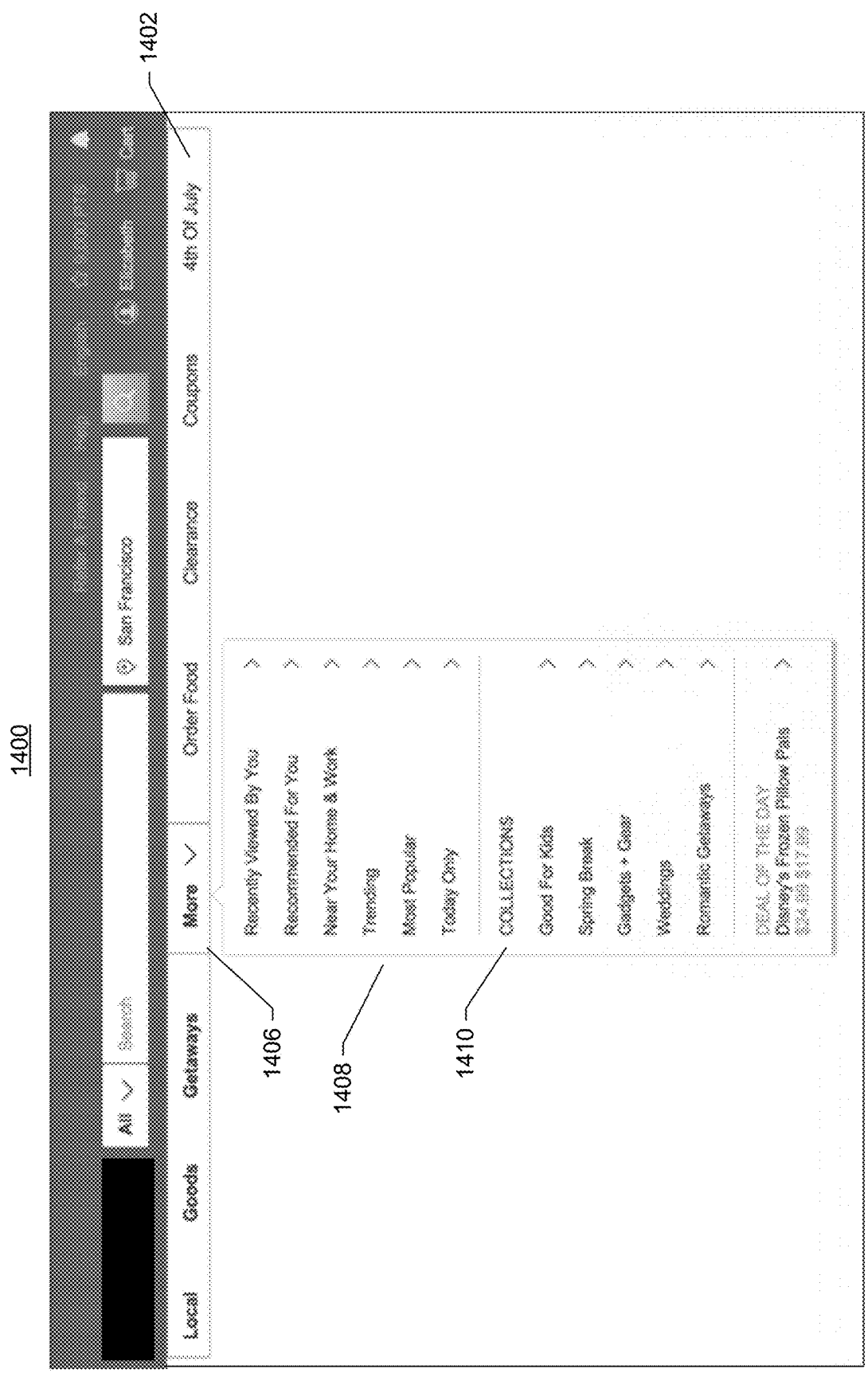
Figure 15:
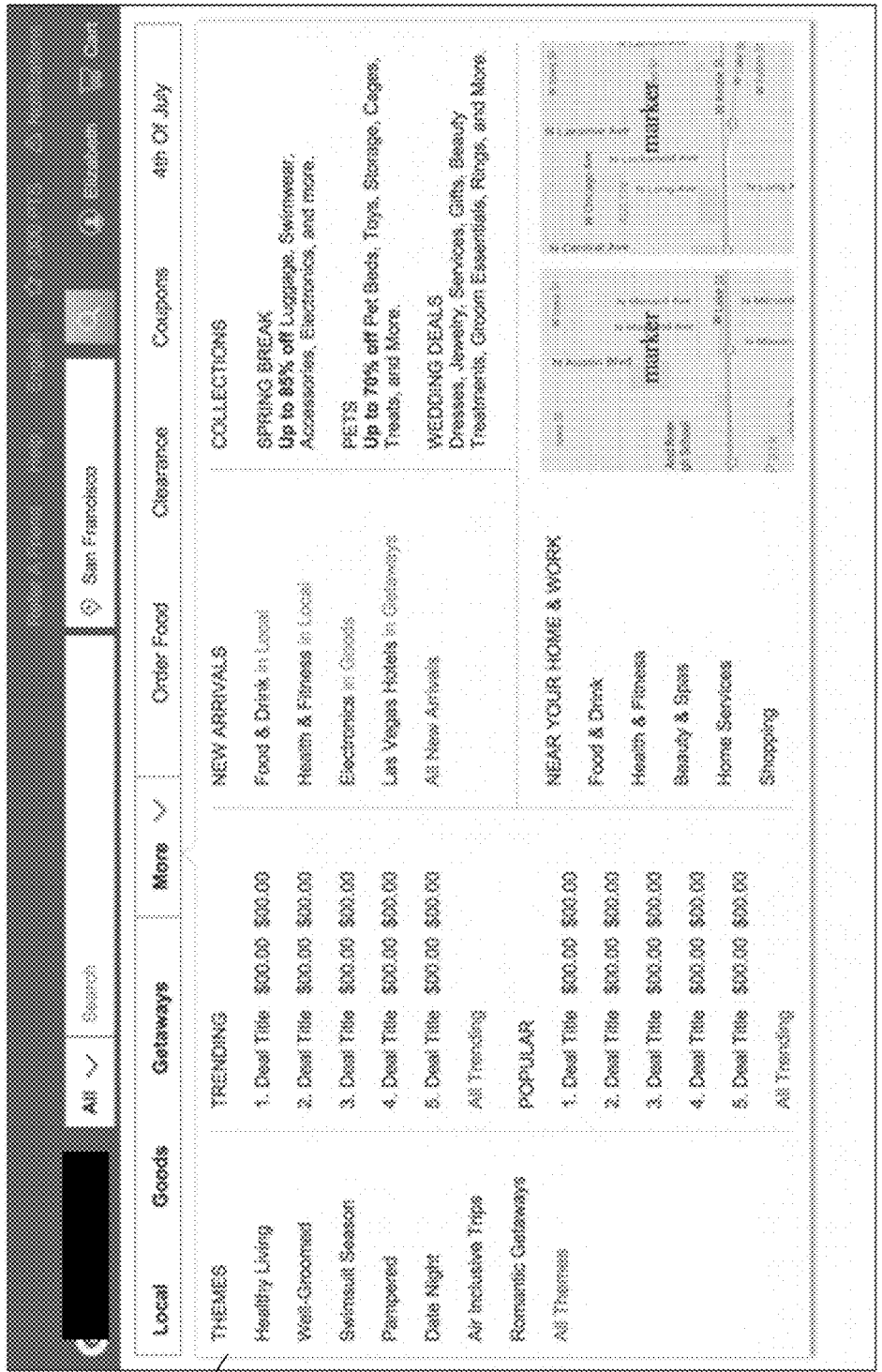
Figure 16:
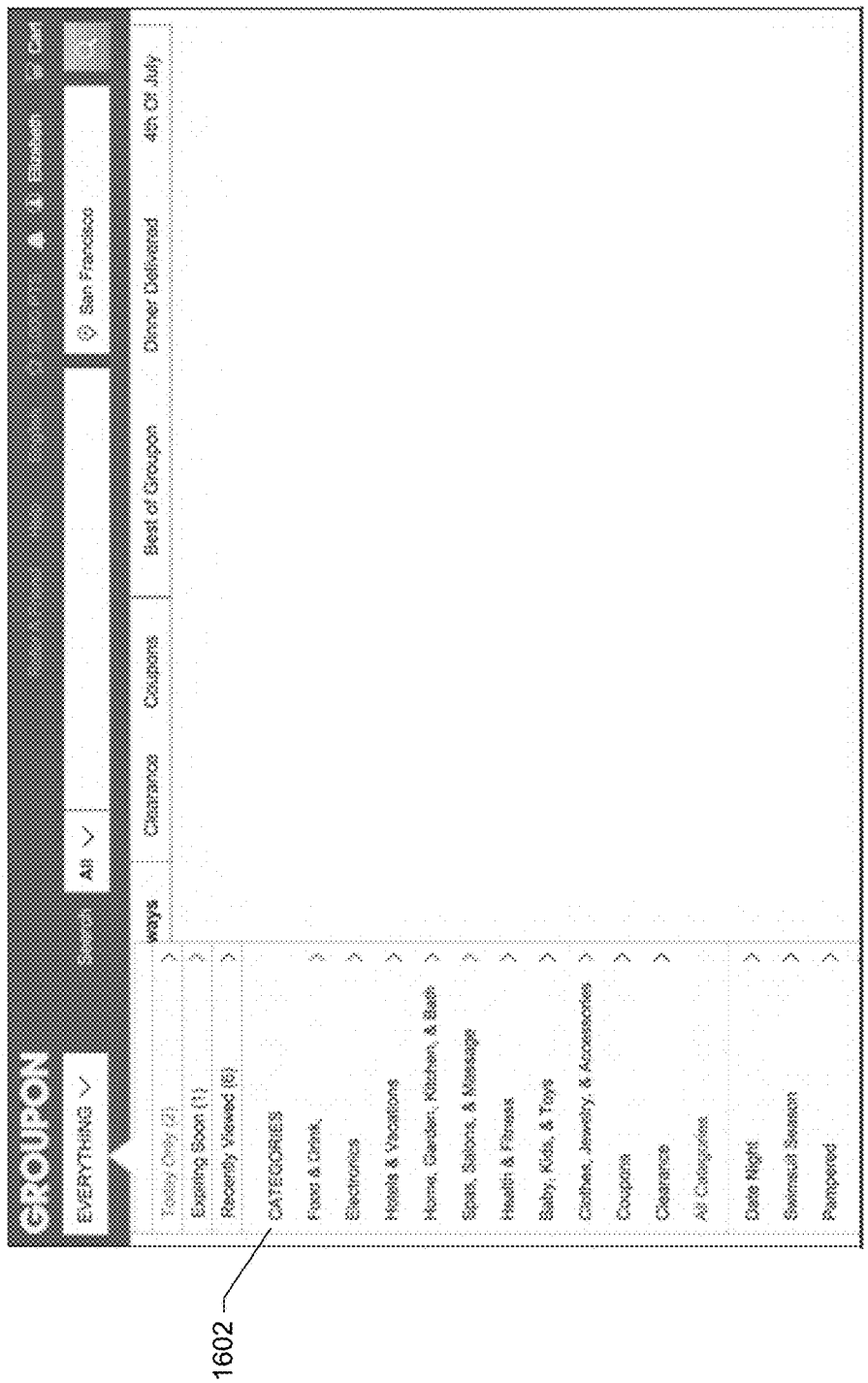
Figure 17:
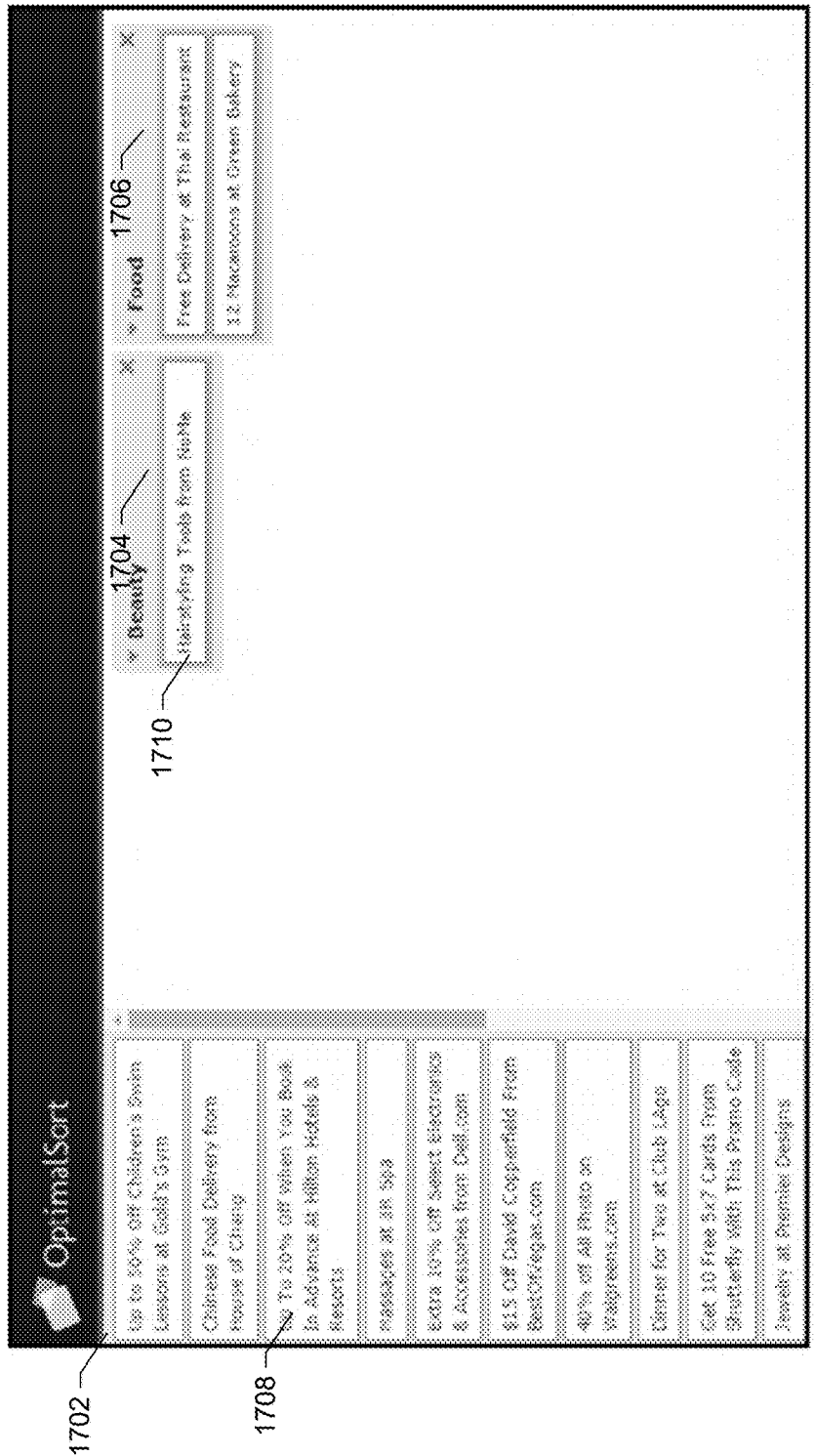
Figure 19:
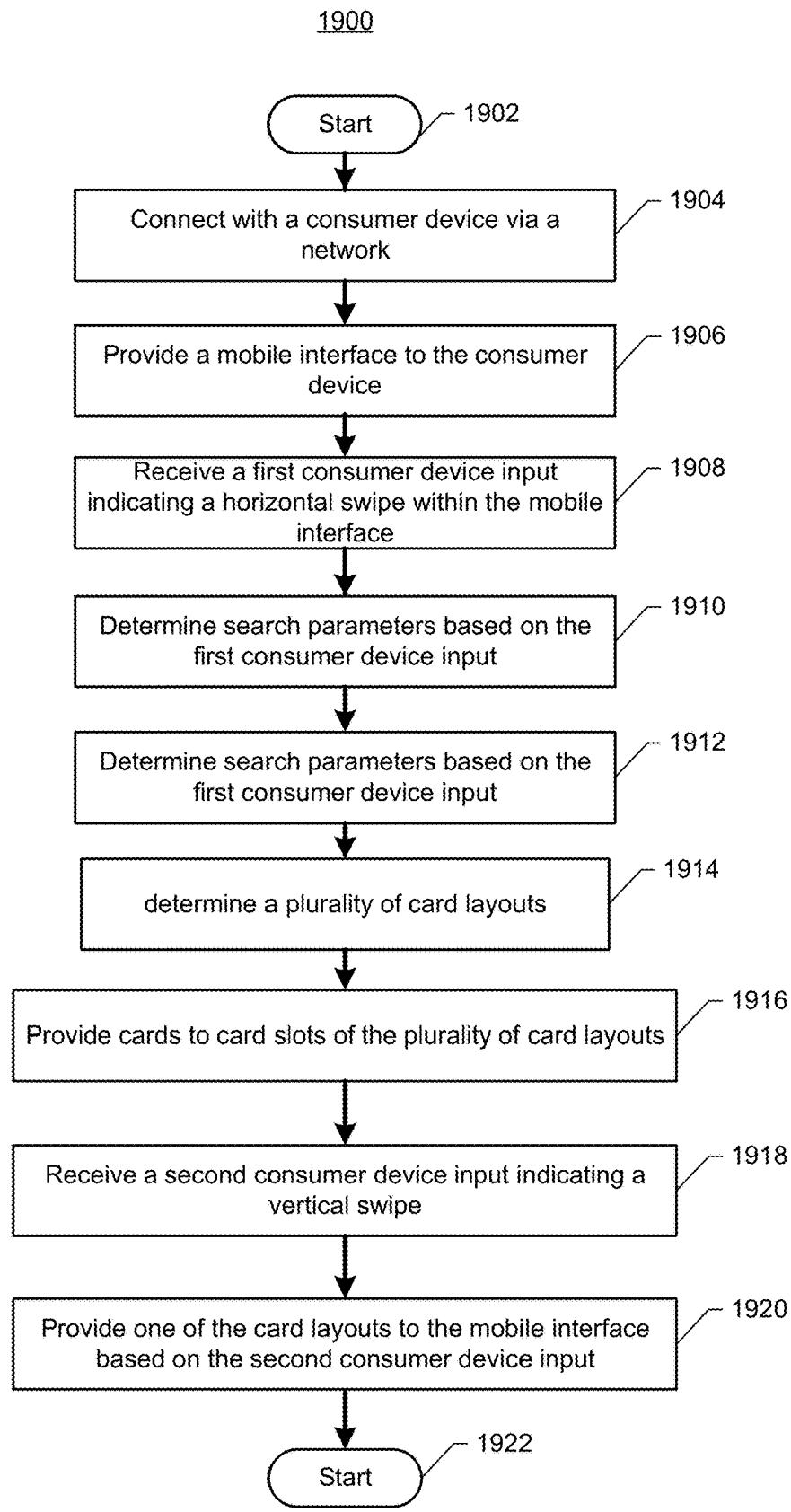
Figure 21:
Figure 20:
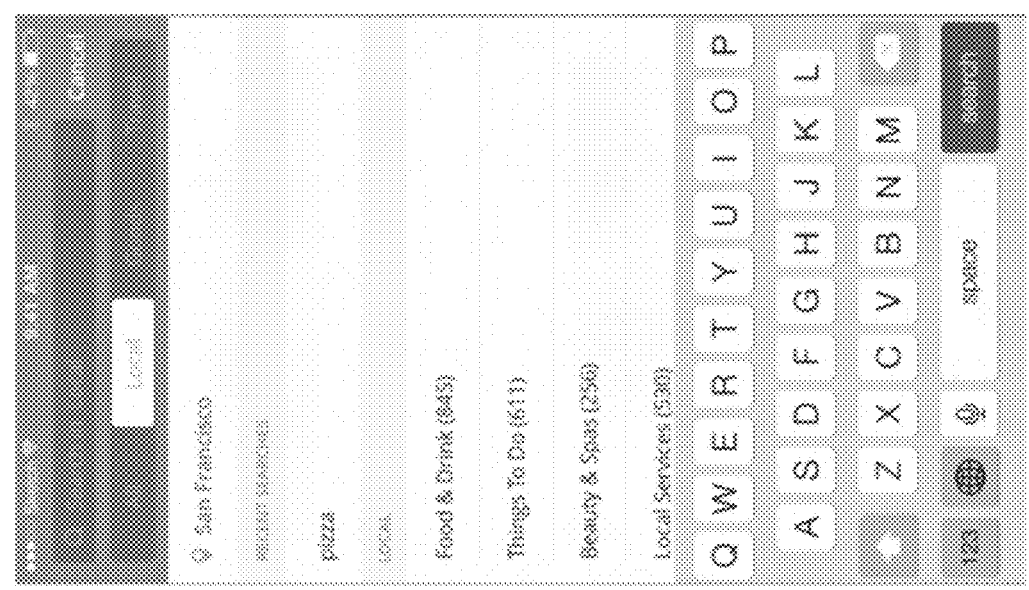
Figure 22:
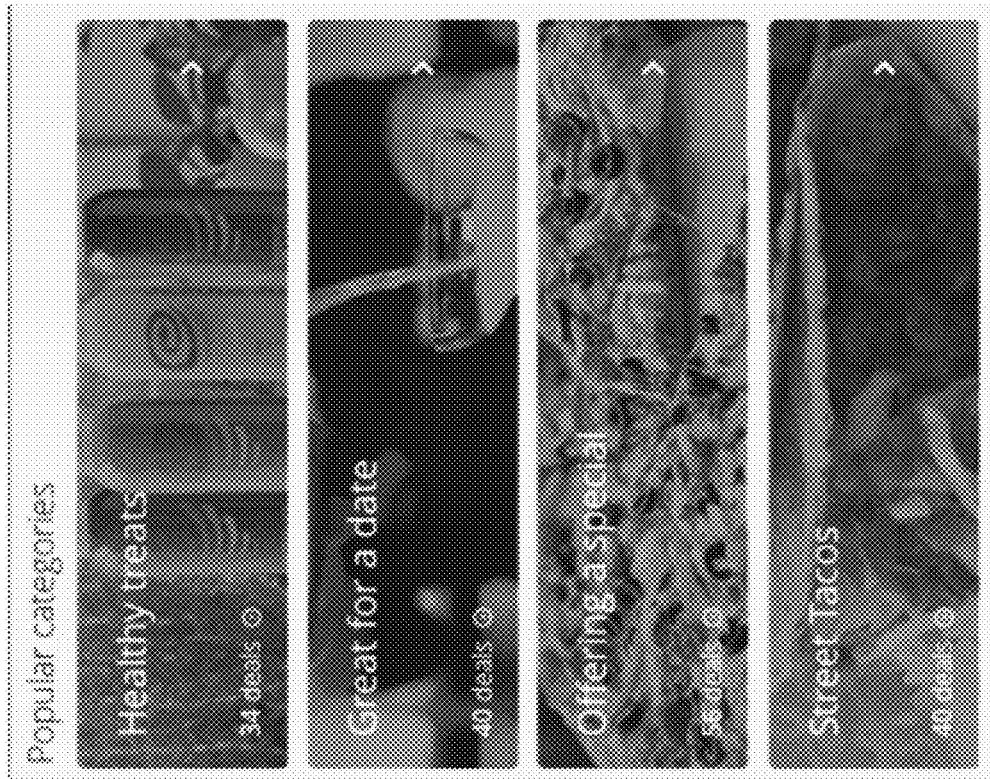
Figure 22:

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows an example of a method of providing a search result interface in accordance with some embodiments;

FIG. 4 shows an example of a method of providing a home interface in accordance with some embodiments;

FIG. 5 shows examples of a search interface in accordance with some embodiments;

FIGS. 6*a* and 6*b* show examples of mobile card layouts in accordance with some embodiments;

FIG. 6*c* shows an example of a desktop card layout in accordance with some embodiments;

FIGS. 7*a*-7*d* show example card layouts in accordance with some embodiments;

FIG. 8 shows an example of a mobile search result interface in accordance with some embodiments;

FIGS. 9-11 show examples of a desktop search result interface in accordance with some embodiments;

FIGS. 12*a*-12*d* show examples of a mobile home interface in accordance with some embodiments;

FIGS. 13*a* and 13*b* show examples of a desktop home interface in accordance with some embodiments;

FIG. 14 shows an example of a navigation interface in accordance with some embodiments;

FIG. 15 shows an example of a navigation interface in accordance with some embodiments;

FIG. 16 shows an example of a navigation interface in accordance with some embodiments;

FIG. 17 shows an example of a navigation sorting interface in accordance with some embodiments;

FIGS. 18a-h show an example of a mobile interface 1800 in accordance with some embodiments;

FIG. 19 shows an example of a method 1900 for providing a mobile interface in accordance with some embodiments;

FIG. 20 shows an example of a mobile search interface in accordance with some embodiments;

FIG. 21 shows an example of a mobile search results interface in accordance with some embodiments;

FIG. 22 shows examples of cards in accordance with some embodiments; and

Figure 23:
Figure 23:
Figure 23:
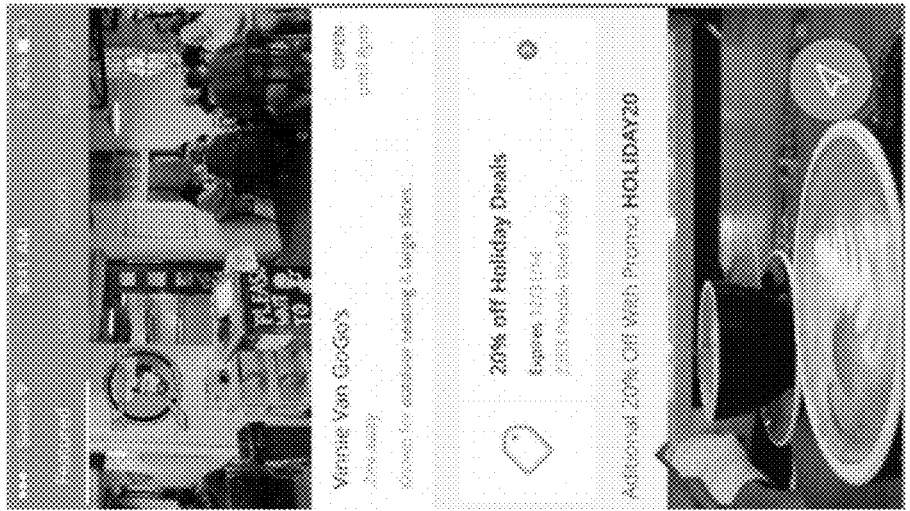

FIG. 23 shows examples of mobile interfaces in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or "promotion service" may include a service that is accessible via one or more computing devices and that is operable to provide promotion and/or marketing services on behalf of one or more providers that are offering one or more instruments that are redeemable for goods, services, experiences and/or the like. The promotion and marketing service may be provided by a promotion and marketing system. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion may be defined by promotion data. In some embodiments, the promotion data may define an inventory amount indicating the number of instances of a promotion that is available for purchase and/or other form of acceptance.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "item" refers to various types of inventory that may be offered by the promotion and marketing system. For example, an item may include a promotion (e.g., specials, offers, etc.), market rate goods (e.g., products, getaways, etc.), coupons, or other articles (e.g., gift cards, etc.). Similar to promotion parameters discussed above, other types of items may be defined by item parameters such as price, category, a particular product, service, or experience, etc. In some embodiments, the promotion and marketing service may be configured to provide search results, such as in response to receiving one or more search parameters, including items of different types. As such, the promotion and marketing service may provide a "universal" search that provides a unified experience for searching across various inventory or item types (e.g., co-ranking of deals, merchant specials, coupons, market rate goods, etc.).

As discussed in further detail herein, the items may be ranked based on their relevance to a consumer, and then presented in a manner that is optimized or suitable for the particular type of consumer device (e.g., mobile or desktop) that the consumer is using to access the promotion and marketing service.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of an item, product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, a "home interface" refers to a landing page, a first screen, a home page, a default interface, or the like that may be presented on the consumer device upon accessing the electronic marketing service. A home interface may include an electronic marketing communication indicating items that are targeted to the consumer (e.g., based on scoring and ranking the items), such as based on electronic marketing information collected from consumer device interactions with the promotion and marketing service. In some embodiments, the promotion and marketing service may be configured to provide different home interfaces that are optimized based on the consumer device type (e.g., mobile or desktop).

As used herein, a "search result interface" refers to a page displayed on the consumer device in response to the consumer device providing one or more search parameters to the promotion and marketing service. A search result interface may include an electronic marketing communication indicating items that are relevant to the search parameters. In some embodiments, the items may additionally be targeted to the consumer based on the consumer's preferences, interests, hobbies, characteristics, etc. Such electronic marketing information may be collected based on consumer device interactions with the promotion and marketing service. In some embodiments, the promotion and marketing service may be configured to provide different search result interface that are optimized based on the consumer device type (e.g., mobile or desktop).

A "card," as used herein, refers to a data object or container for data, or an "electronic marketing message," that can be included within an electronic marketing communication. For example, a card may include item data defining a promotion, category, collection, special, coupon, article/good (e.g., product, service, or experience), sale, etc. In some embodiments, a card may additionally include presentation data, such as images, videos, card meta data, format data, layout data, etc. A card may represent an area on a display or interface where the electronic marketing message of the card is located. A card can represent a single item, or multiple items (e.g., a promotion and a collection offered together, an article and a video advertisement or informational presentation, etc.). Cards may be used as flexible building blocks for various user interfaces discussed herein. Advantageously, different interfaces and/or consumer device types may use different card layouts or templates, while the circuitry and programming associated with card scoring, selection, and/or ranking may be common for any consumer device type. Furthermore, because cards can represent various types of items, the scoring, selection, and/or ranking may include techniques for co-ranking of the different item types.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. Consumers and merchants may access a promotion and marketing service from a promotion and marketing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104 and a database 106.

The server 104 may be embodied as a single computer or multiple computers. The server 104 may be configured to provide the promotion and marketing service. For example, the server 104 may provide for receiving of electronic data from various sources, including but not necessarily limited to the consumer devices 108A-108N and the merchant devices 110A-110N. The server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic marketing communications and/or electronic user interfaces based on the received electronic data (e.g., electronic marketing data, etc.). Although a single server 104 is shown, system 102 may include one or more servers 104. In some embodiments, one or more servers 104 may include a promotion service circuitry 210 and/or universal relevance circuitry 212, as shown in FIG. 2.

Returning to FIG. 1, database 106 may be embodied as a data storage device such as a Network Attached Storage (NAS) device or devices, or as a separate database server or servers. The database 106 includes information accessed and stored by the server 104 to facilitate the operations of the promotion and marketing system 102. For example, the database 106 may include, without limitation, electronic marketing information, user account credentials for system administrators, merchants, and consumers, item data indicating items (e.g., promotions, market rate goods, coupons, articles, etc.) offered by the promotion and marketing service, consumer account and/or other consumer data, clickstream data, analytic results, reports, financial data, and/or the like. In some embodiments, database 106 may represent one or more databases storing some or all of the data discussed herein.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing system 102 may leverage the application framework offered by the mobile operating system to allow consumers to designate which information is provided to the app and which may then be provided to the promotion and marketing system 102. In some embodiments, consumers may "opt in" to provide particular data to the promotion and marketing system 102 in exchange for a benefit, such as improved relevancy of marketing communications offered to the user. In some embodiments, the consumer may be provided with privacy information and other terms and conditions related to the information provided to the promotion and marketing system 102 during installation or use of the app. Once the consumer provides access to a particular feature of the mobile device, information derived from that feature may be provided to the promotion and marketing system 102 to improve the quality of the consumer's interactions with the promotion and marketing service.

For example, the consumer may indicate that they wish to provide location information to the app from location services circuitry included in their mobile device. Providing this information to the promotion and marketing system 102 may enable the promotion and marketing system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing system 102. For example, the consumer may decide at a later point to disable the ability of the app to access the location services circuitry, thus limiting the access of the consumer's location information to the promotion and marketing system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing system 102 via a web browser. As yet another example, the consumer device 108 may include various hardware or firmware designed to interface with the promotion and marketing system 102 (e.g., where the consumer device 108 is a purpose-built device offered for the primary purpose of communicating with the promotion and marketing system 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing system 102 to enable the promotion and marketing system 102 to generate promotions or other marketing information to be provided to consumers.

Example Apparatus[es] for Implementing Various Embodiments

The server 104, consumer device 109 and/or merchant device 110 may be embodied by one or more computing systems, such as apparatus 200 shown in FIG. 2. As illustrated in FIG. 2, the apparatus 200 may include a processor 202, a memory 204, an input/output circuitry 206, communications circuitry 208, promotion service circuitry 210, and universal relevance circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The promotion service circuitry 210 may include hardware configured to generate and provide electronic marketing communications to consumer devices. In some embodiments, the promotion service circuitry 210 may be configured to provide the functionality discussed herein with respect to providing electronic marketing communications and associated interfaces to consumer devices.

The universal relevance circuitry 212 may include hardware configured to generate and provide item scores and rankings, both in real-time—such as in response to a request from the promotion service circuitry 210—and in batch—such as for scheduled push or pre-computation. In some embodiments, the universal relevance circuitry 212 may be configured to provide the functionality discussed herein with respect to providing card scores and card rankings. The universal relevance circuitry 212 may be further configured to receive one or more search parameters, and perform the scoring and/or ranking based on the search parameters.

The promotion service circuitry 210 and/or universal relevance circuitry 212 may utilize processing circuitry, such as the processor 202, to perform these actions. However, it should also be appreciated that, in some embodiments, the promotion service circuitry 210 and/or universal relevance circuitry 212 may include a separate processor, specially configured field programmable gate array (FPGA), or application specific interface circuit (ASIC). The promotion service circuitry 210 and/or universal relevance circuitry 212 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Universal Search

FIG. 3 shows an example of a method 300 of providing a search result interface in accordance with some embodiments. Method 300 is discussed herein as being performed by system 200, in particular the one or more servers 104. However, various other suitably configured apparatuses, devices, and/or servers may also be used.

Method 300 may begin at 302 and proceed to 304, where the one or more servers 104 (e.g., including promotion service circuitry 210, which is not repeated for subsequent steps) may be configured to connect with a consumer device via a network. For example, the one or more servers 104 may connect with the consumer device via network 112. In another example, a consumer device 108 may connect with a merchant device 110, which may serve as an intermediary for communications between the consumer device 110 and the one or more servers 102 discussed herein. In some embodiments, such a connection may be based on a network and/or wireless connection that is separate from the network 112 (e.g., the Internet). For example, the consumer device 108 and merchant device 110 may form a direct wireless connection when the consumer device 108 enters a wireless communicable range of the merchant device 110, such as via using Bluetooth, WiFi, radio frequency communication, near field communication, etc.

At 306, the one or more servers 104 (e.g., promotion service circuitry 210) may be configured to provide a search interface to the consumer device. The search interface may be an interactive electronic user interface that is provided by the promotion and marketing service to facilitate item searching with search parameters. The search parameters may include a search term, and in some embodiments, may also include other search criteria, such as location, item type or category, etc. As discussed above, the one or more servers 104 may be configured to provide a promotion and marketing service to consumer devices 108 via network 12, and using various communication channels such as a webpage, application (e.g., mobile or desktop), short messaging service (SMS) text, social network feed, etc.

For example, a desktop consumer device user may access the promotion and marketing service via a webpage, such as by entering a uniform resource locator (URL) address of the promotion and marketing service within the address field of a web browser. In another example, a mobile consumer device user may access the promotion marketing service via a mobile application that is installed on the mobile consumer device. However, various techniques for providing access to the promotion and marketing service may be used. For example, a mobile consumer device may additionally or alternatively include a mobile web browser. In some embodiments, the promotion and marketing system 102 may be configured to provide consumer accounts, which may be accessed by consumer devices, such as by providing login data.

FIG. 5 shows examples of a search interface 500 in accordance with some embodiments. Search interface 500 may be configured to operate as an interactive user interface on the consumer device for creation of search parameters based on consumer device inputs. Search interface 500 may include search term input 502, item type filer 504, location filter 506, and search assistant 508. Search term input 502 may be configured to receive a search term, which may include one or more characters, words, phrases, etc., such as in response to consumer device input (e.g., touchscreen for a mobile device, keyboard for a stationary device, etc.). As discussed in greater detail below, the search term may be used as a basis for selecting items for presentation to the consumer device.

In addition to the search term, an item search may be further based on one or more additional search parameters. For example, location filter 506 may be configured to receive consumer device input defining a search location, such as a city (e.g., San Francisco), neighborhood, zip code, address, etc. Based on the input received at location filter 506, items may be selected based on relevance or proximity to the location. For example, the inputted location may be compared with redemption locations for promotions, merchant locations for in-store goods pickup or service, etc. In some embodiments, the location search parameter may be programmatically determined based on the location data indicating consumer device location. The location data may be provided by various systems capable of determining location information, including, but not limited to, global positioning service receivers, indoor navigation systems, cellular tower triangulation techniques, video surveillance systems, or radio frequency identification (RFID) location systems.

Item type filter 504 may be configured to receive consumer device input defining one or more item categories. As shown at 512, item categories including All, Local Deals, Goods, Getaways, Order Food, and Coupons may listed within the search interface, such as based on selection of the associated drop down box. In some embodiments, the search interface may be modified based on the category defined by the input type input. For example, based on selection of the Destination item category, location filter 506 is replaced with date filter 514 to allow consumer selection of a travel date. Here, the travel date may be another example of a consumer defined criteria for item searching where the item is a destination (e.g., transportation booking, hotel booking, tours, vacation packages, etc.)

Search assistant 508 may be configured to provide informational displays that are tailored to the consumer defined criteria within search interface 500. For example, search assistant 508 may display top searches (e.g., across one or more item categories) in response to the consumer selecting the All category within item type filter 504. In another example, based on consumer device input defining a search term or a portion of a search term, search assistant may 508 be configured to display recommended and/or best guess search terms 510 within the search assistant 508. In another example, based on consumer device input defining the Destination category, search assistant may 508 may be configured to display recommended and/or popular destinations 516 at search assistant 508.

At 308, the one or more servers 104 may be configured to receive one or more search parameters from the consumer device via the network. For example, the search parameters may be entered via consumer device input within the search interface. The one or more servers 104 may be further configured to receive one or more of the additional search criteria provided from the consumer device via the search interface. For example and with reference to FIG. 5, the one or more servers 104 may receive the consumer device inputs associated with the search term and/or other search parameters (e.g., location, category, etc.) based consumer interaction with the search interface 500 as discussed above.

In some embodiments, the one or more servers 104 may be configured to provide one or more browsing interfaces. For example, the browsing interfaces may also be provided to the consumer device to define search parameters. Based on the consumer selection of predetermined category buttons, or the like, suitable search parameters may be generated. Based on the search parameters, card scores may be determined and used to populated browsing interfaces. Such browsing interfaces may also include dedicated mobile and/or desktop layouts that are optimized as discussed herein. In some embodiments, a mobile interface may be provided that allows for search parameter definition based on horizontal swiping, and for card layout browsing based on vertical swiping, as discussed in greater detail below.

In some embodiments, a search interface may be optimized for mobile or inclusion within a mobile interface. FIG. 20 shows an example of a mobile search interface in accordance with some embodiments.

At 310, the one or more servers 104 may be configured to determine cards scores for candidate cards based on the search term, wherein each card includes an electronic marketing message indicating one or more items. A "card" refers to a data object or container for data that can be included within an electronic marketing communication for one or more items. For example, a card may include item data defining a promotion, category, collection, special, coupon, article/good (e.g., product, service, or experience), sale, etc. In some embodiments, a card may additionally include presentation data, such as images, videos, texts, card meta data, format data, layout data, etc.

A card may represent an area on a display or interface where the electronic marketing message of the card is located. A card can represent a single item, or multiple items (e.g., a promotion and a collection offered together, an article and a video advertisement or informational presentation, etc.). Cards may be used as flexible building blocks for various user interfaces discussed herein. Advantageously, different interfaces and/or consumer device types may use different card layouts or templates, while the circuitry and programming associated with card scoring, selection, and/or ranking may be common for any consumer device type. Furthermore, because cards can represent various types of items, the scoring, selection, and/or ranking may include techniques for co-ranking of the different item types.

A "card score," as used herein, refers to a value or score indicating the relevance of a card to the search parameters and/or other criteria (e.g., electronic marketing information). The candidate cards may refer to cards stored in a card database, or the like, that are available for being provided to consumer devices within electronic marketing communications. A card may represent a container that stores or includes one or more items. As such, the card scores may be determined based on determining item scores of the one or more items associated with the card. For example, the each item may be associated with item parameters or attributes. Those item parameters may be programmatically compared with the search parameters using a relevance/matching algorithm, and item scores may be generated for each item indicating level of relevance/match. The card score for a card, being a collection of one or more items, may then be determined based on the item scores. For example, the items scores may be summed, or averaged, etc. Although various suitable techniques for determining item scores may be used, details regarding one embodiment of determining item scores and rankings, and thus card scores and card rankings, are discussed below. FIG. 22 shows examples of cards 2200 in accordance with some embodiments.

At 314, the one or more servers 104 (e.g., universal relevance service circuitry 212) may be configured to determine a card score ranking based on the card scores. For example, the universal relevance service circuitry 212 may be configured to receive the search parameters and determine items scores and/or item rankings as discussed in U.S. Provisional Patent Application No. 62/140,957, filed Mar. 31, 2015, and U.S. patent application Ser. No. 15/085,849, filed Mar. 30, 2016, each titled "Universal Relevance Service Framework," and each incorporated by reference herein in its entirety. For examples, items may be filtered based on item-level business rules derived from the search parameters such as item category, location, etc. An attribute graph for item attributes may be used for query understanding of the search term. In some embodiments, item scoring may be further based on consumer information and/or electronic marketing information. For example and for a consumer account or profile (e.g., preferences, interests, group membership, hobbies, characteristics, age, etc.), a scoring function may be run to produce a user-item relevance score. The user-item relevance score may be based on a conversion rate estimate (i.e., the probability that the user is going to make a purchase), and/or other electronic marketing information (e.g., clickstream data). Thus, the scoring function may calculate the user-item relevance score based on expected revenue. In some embodiments of the universal relevance service, the scoring function is executed in a distributed search cluster. The card score may then be determined based on the associated item scores. A card ranking of the candidate cards may then be determined based on the card scores for the candidate cards.

In some embodiments, the card scores and card score rankings may be based on electronic marketing information received from a mobile consumer device. The electronic marketing information may provide contextual data for the card scores that are tailored to the individual consumer. For example, the electronic marketing information may include location data defining consumer location, environmental data (e.g., temperature, precipitation, etc.), merchant location check-in/purchase data, clickstream data, or other information that may be tracked indicating how the consumer device is used for interactions with merchant devices and/or the promotion and marketing system. Additional details regarding scoring of items based on tracking various consumer device signals, applicable in some embodiments, are discussed in U.S. Provisional Patent Application No. 62/019,214, titled "Systems and Methods For Providing Dimensional Promotional Offers," filed Jun. 30, 2014, which is incorporated by reference herein in its entirety.

At 316, the one or more servers 104 may be configured to determine whether the consumer device is a mobile device or a desktop device. In some embodiments, the one or more servers 104 may be configured to determine a device type based on the communication channel used by the consumer device to access to promotion and marketing service. For example, the one or more servers 104 may determine that the consumer device is a mobile device based on the communication channel being SMS text, a mobile application, or a mobile browser. In another example, the one or more servers 104 may determine the consumer device is a desktop or other non-mobile device based on the communication channel being a desktop application, a desktop browser, etc. In some embodiments, where the consumer device is using a browser, the one or more servers may be configured to perform user agent sniffing or the like to determine the type of browser and/or operating system (e.g., mobile or desktop) that is being used on the consumer device.

For example, if the consumer device is connected with the one or more servers 104 via a browser application, the one or more servers may be configured to request or query a user agent string from the consumer device that includes a BrowserName/VersionNumber token string, and the string may be compared with known browsers that are supported, and having known mobile or desktop functions. Additionally or alternatively, other parts of the user agent string may be used such as browser version, rendering engine (e.g., Chrome, Trident Opera, AppleWebKit, Gecko, etc.), rendering engine version, and/or or consumer device operating system (e.g., Windows, OS X, Android, iOS, etc.). Advantageously, browsers sharing a common rendering engine display pages the same way. In some embodiments, the physical dimensions or characteristics of the consumer device may additionally or alternatively be used. For example, the consumer application may request via an API to the mobile device operating system to retrieve screen resolution, screen orientation (e.g., from accelerometer), output devices (e.g., touch screen), hardware components, etc. that are indicative of both whether the consumer device is mobile or desktop, as well as the relevant input/output characteristics of the display device.

In response to determining that the consumer device is a mobile device, method 300 may proceed to 316, where the one or more servers 104 may be configured to determine a mobile card layout. FIGS. 6a and 6b show examples of mobile card layouts 600 and 620 respectively, in accordance with some embodiments. Mobile card layout 600 may be configured for a handheld mobile device, such as a mobile phone, tablet, or the like. Mobile card layout 620 may be configured for a mobile device with a smaller screen, such as a wearable device (e.g., smart watch, smart glasses, etc.). A mobile card layout may include a background region 602 and card slot regions 604, defining the locations within the mobile card layout that cards may be inserted. For each template, a card may be programmatically selected for insertion within each card slot region 604.

Card layouts may be configured such that cards are optimized for a particular consumer mobile device and/or screen size. For example, a card layout may be configured or scaled to along one or more dimensions of the screen size of the consumer device such that the one or more entire dimensions of card layout is visible within the interface (e.g., without requiring further scrolling). The various interfaces, such as search result interfaces, navigation or menu interfaces, and/or home interfaces, may each present electronic marketing information as cards disposed within card layouts. The interfaces may allow consumers to navigate through cards by, for example, swiping a mobile device touch screen, to move between card layouts as discussed in greater detail below. In some embodiments, a card layout may extend beyond the screen size shown in FIGS. 6a-6c to provide for additional card slots that may be accessed via interface scrolling (e.g., in the vertical or horizontal direction).

In some embodiments, the arrangement of card slots within a mobile card layout 600 may also be determined based on the consumer device type or screen size. For example, the mobile card layout 600 for handheld devices may include between one to three card slots 604 in each row. In another example, mobile card layout 620 for wearable devices may include only a maximum of one card slot in each row. As discussed in greater detail below, FIG. 6c shows an example of a desktop card layout 640. Desktop card layout 640 may be optimized for desktop consumer device or other consumer device including screens sizes that are larger than hand held devices. Desktop card layout may include between one to four card slots 604 in each row. In general, there may be many options for flexible card layouts. FIGS. 7a-7d show examples of card layouts in accordance with some embodiments.

In some embodiments, the mobile card layout and/or arrangement of card slots may be determined based on electronic marketing information, such as tracking a preferred orientation of the mobile consumer device display (e.g., horizontal vs. vertical). For example, orientation data from an accelerometer or other motion sensor of the consumer device may be used to track the device orientation while the consumer interacts with electronic marketing communications or otherwise with the promotion and marketing system. The most used orientation (or a user defined orientation) may be determined as a default or preferred orientation of the consumer. As such, the mobile card layout and/or arrangement of card slots may be selected to conform with or otherwise be optimized for the preferred orientation.

At 318, the one or more servers 104 may be configured to generate a mobile search result interface based on the mobile card layout. FIG. 8 shows an example of a mobile search result interface 800 in accordance with some embodiments. Mobile search result interface 800 may include a search interface region 802 and a card layout region 804. The search interface region 802 may include a search query indicator/input 806, as well as a search parameter display 808 indicating search parameters of the search. The search interface region 802 may further include a refine search button 810, which may return the consumer to a search interface for receiving and/or adjusting search parameters. Card layout region 804 may be configured based on the card layout determined above. Here, the mobile search result interface 800 may use a mobile card layout such as mobile card layout 600 or 620 shown in FIGS. 6a and 6b respectively. In some embodiments, a search interface may be optimized for mobile or inclusion within a mobile interface. FIG. 21 shows another example of a mobile search 2100 interface in accordance with some embodiments.

At 320, the one or more servers 104 may be configured to provide one or more of the candidate cards to the mobile search result interface based on the card score ranking and the mobile card layout. With reference to mobile search result interface 800 shown in FIG. 8, the card slots defined by the mobile card layout of the card layout region 804 may be populated based on the card score ranking of the candidate card scores. For example, in some embodiments, the top N candidate cards may be selected for inclusion within a card layout including N card slots.

For example, card layout region 804 includes a vertical column of single card slots. Subsequent to card insertion, card layout region 804 includes cards 812, 814, 816, 818, and 820. Each of cards 812-820 indicates and/or represents one or more different items that resulted in the card score ranking. For example, card 812 includes a merchant item (e.g., a merchant with the name "Sushi Time" matching the search term), card 814 includes a coupon item, card 816 includes a special item, card 818 includes three category items (e.g., the sushi bar, Japanese Restaurant, and Korean Restaurant categories), and card 820 includes a special item (e.g., a related deal).

In some embodiments, card slots within a card layout and/or card layout region 804 may be associated with different values. For example, larger dimension card slots may be given higher priority for higher scoring cards than smaller dimension card slots. In another example, a card slot that is at the top, beginning, or otherwise most prominent or readily viewable portion of the card layout and/or card layout region 804 may be may be given higher priority for higher scoring cards than card slots that are less prominent (e.g., at the bottom of a screen, or accessible via scrolling). With reference to FIGS. 7a-7d, for example, card slots 604 are numbered based on priority values, with 1 being the highest priority card slot for the highest ranking card, 2 being the second highest priority card slot, and so forth. In some embodiments, cards may be associated with a default size, look, etc, and may be flexibly scaled larger or smaller based on the dimensions or size of the card slot.

In some embodiments, cards may additionally or alternatively be selected for card slots based on item category/type. For example, a search result interface may be configured to sequence card placement within a card layout based on item category. For example, items associated with specials or offers may be disposed at card slots at the top of a card layout region 804, market rate getaways and goods may be disposed at card slots at a subsequent portion of the card layout region 804, coupons may be disposed at card slots at a further subsequent portion of the card layout region 804, and other item types (e.g., articles, gift cards, etc.) may disposed at card slots at an even further subsequent portion (e.g., the end) of the card layout region 804. In some embodiments, the one or more servers 104 may be configured to provide a predetermined number of items for each category. For example, at least best scoring item may be provided to each category. In another example, the items may be co-ranked or otherwise scored together, and the highest ranking N items may then be placed in the N card slots. Thus the relative card placement may be based on category/item type rules and/or card score ranking results.

In some embodiments, the consumer device 108 may be configured to generate one or more of the interfaces discussed herein. For example, where the consumer device generates a search result interface, the one or more servers 104 may be configured to provide relevant search result data (e.g., card data, item data, etc.) associated with the search parameters to the consumer device. The consumer device may then populate the search result interface by inserting the cards within the card layout of the search result interface.

Returning to 314, in response to determining that the consumer device is a desktop device, method 300 may proceed to 322, where the one or more servers 104 may be configured to determine a desktop card layout. As discussed above, FIG. 6c shows an example desktop card layout 640. The desktop card layout 640 may be optimized for screen sizes that are larger than handheld devices, as well as for consumer input devices typically available for desktops such as a keyboard and mouse.

At 324, the one or more servers 104 may be configured to generate a desktop search result interface based on the desktop card layout. Some or all of the discussion above regarding the mobile search result interface may be applicable to the desktop search result interface.

At 326, the one or more servers 104 may be configured to provide one or more of the candidate cards to the desktop search result interface based on the card score ranking and the desktop card layout. FIGS. 9-11 show examples of a desktop search result interface 900 in accordance with some embodiments. With reference to FIG. 9, desktop search result interface 900 may include a search interface region 902, a card layout region 904, and a search filter region 906. The search interface region 902 may include a search query indicator/input 908, as well as a location search parameter display 910 indicating the location search parameter of the search.

Card layout region 904 may be configured based on the desktop card layout determined above. Here, the desktop search result interface 900 may use a desktop card layout such as desktop card layout 640 shown in FIG. 6c. Here, card layout region 904 includes multiple rows of card slots, with each row including two card slots. Within the card slots, card layout 904 includes cards 912, 914, 916, 918, 920, and 922.

The search filter region 906 may be configured to be presented within the desktop search result interface 900 concurrently (e.g., side by side, in adjacent windows, etc.) with the card layout region 904. The search filter region 906 may allow for search parameter refinement via the selection of item category/type. For example, the search filter region 906 may be configured to provide a filter menu that allows filtering based on a hierarchy of item categories. For example, the order of item categories within the search filter region may include: "local" items (e.g., food and drink, things to do, shopping, local services, etc.), goods (e.g., home and garden, food and drink, health and beauty, etc.), getaways (e.g, hotels, bed and breakfast, etc.), location, and interests (e.g., inspirational browsing categories).

In some embodiments, based on consumer device input to the search filter region 906 indicating updated search parameters, the one or more servers 104 may be configured to perform another card scoring and ranking (e.g., based on sending a request to the universal relevance service), and may update the search result interface accordingly. Method 300 may then proceed to 330 and end.

Home and Browsing Search Interfaces

FIG. 4 shows an example of a method 400 of providing a home interface in accordance with some embodiments. Similar to a search result interface, a home interface (or "feature interface") may also include an electronic marketing communication that is generated based on cards representing items. However, unlike method 300, method 400 may be performed without search terms. Instead, the card scoring and ranking may be performed based on electronic marketing information that has been collected for the consumer (e.g., such as based on historical consumer device interactions with the promotion and marketing service). Here, the electronic marketing information may be used as search parameters. Method 400 is discussed herein as being performed by system 200, in particular the one or more servers 104. However, various other suitably configured apparatuses, devices, and/or servers may also be used.

Method 400 may begin at 402 and proceed to 404, where the one or more servers 104 (e.g., including promotion service circuitry 210, which is not repeated for subsequent steps) may be configured to connect with consumer devices via the network. The discussion at 304 of method 300 may be applicable at 404. For example, the one or more servers 104 may connect with the consumer device 108, either directly (e.g., via network 112, or based on the merchant device 110 acting as an intermediary.

At 406, the one or more servers 104 may be configured to identify a consumer account and associated electronic marketing information. For example, the one or more servers 104 may be configured to receive login data or other identifying data (e.g., wallet/device identifying token) from the consumer device. The one or more servers 104 may check the received data with a consumer database (e.g., database 106) of the promotion and marketing service. If a valid account is identified, the consumer device may be provided access to the promotion and marketing service.

As discussed above, electronic marketing information refers to various electronic data and/or signals that may be interpreted by the promotion and marketing service to provide improved electronic marketing communications. Electronic marketing information may include, without limitation, clickstream data (e.g., received from consumer devices via the network, such as in response to previous electronic marketing communications), transaction data, location data, communication channel data, discretionary data, or any other data stored by or received by the promotion and marketing service for use in providing electronic communications to consumers. The electronic marketing information of a consumer may be associated with the consumer account. In some embodiments, the consumer account and associated information may be stored in one or more consumer databases.

At 408, the one or more servers 104 may be configured to determine card scores for candidate cards based on the electronic marketing information, wherein each card includes an electronic marketing message indicating one or more items. At 410, the one or more servers 104 may be configured to determine a card score rankings based on the card scores. The discussion above at 310 and 312 of method 300 may be applicable at 408 and 410 respectively. For example, the universal relevance service circuitry 212 may be configured to determine items scores and/or item rankings based on electronic marketing information as discussed in U.S. Provisional Patent Application No. 62/140,957, incorporated by reference above. For a given consumer account and associated consumer information (e.g., preferences, interests, group membership, hobbies, characteristics, age, etc.), a scoring function may be run to produce a user-item relevance score. The user-item relevance score may be based on a conversion rate estimate (i.e., the probability that the user is going to make a purchase) that is generated based on the electronic marketing information. Thus, the scoring function may calculate the user-item relevance score based on expected revenue in some embodiments. However, other factors may be used or weighted into the scoring, such as expected conversion, freshness, inventory levels, etc.

At 412, the one or more servers 104 may be configured to determine whether the consumer device is a mobile device or a desktop device. The discussion at 314 of method 300 may be applicable at 412.

In response to determining that the consumer device is a mobile device, method 400 may proceed to 414, where the one or more servers 104 may be configured to determine a mobile card layout. The discussion at 316 of method 300 may be applicable at 412. In that sense, the same card layouts that are used for search results interfaces may also be used for home interfaces depending on the consumer device type.

Figure 12A:
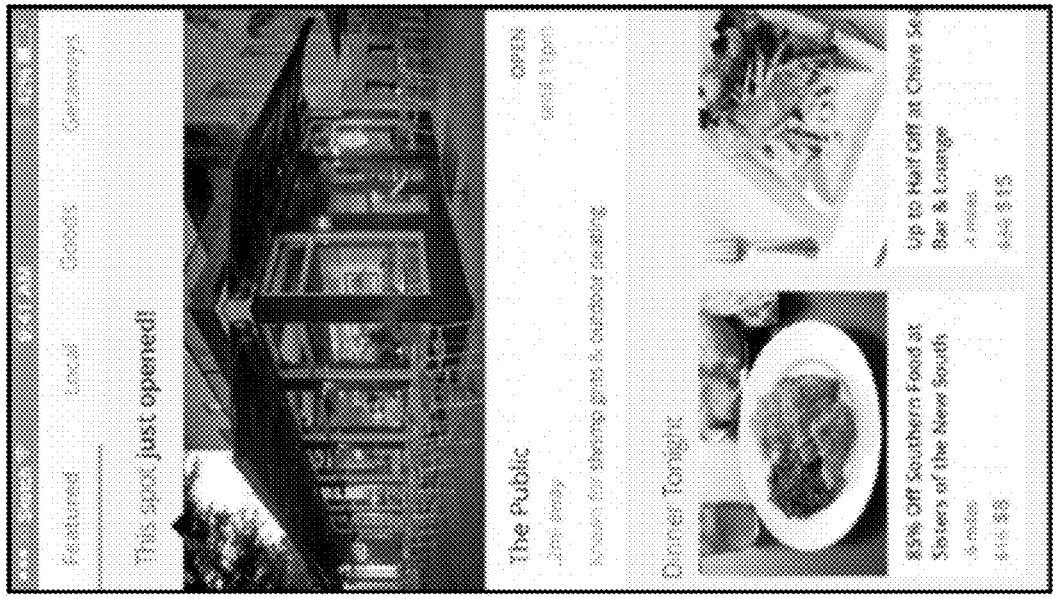
Figure 12B:
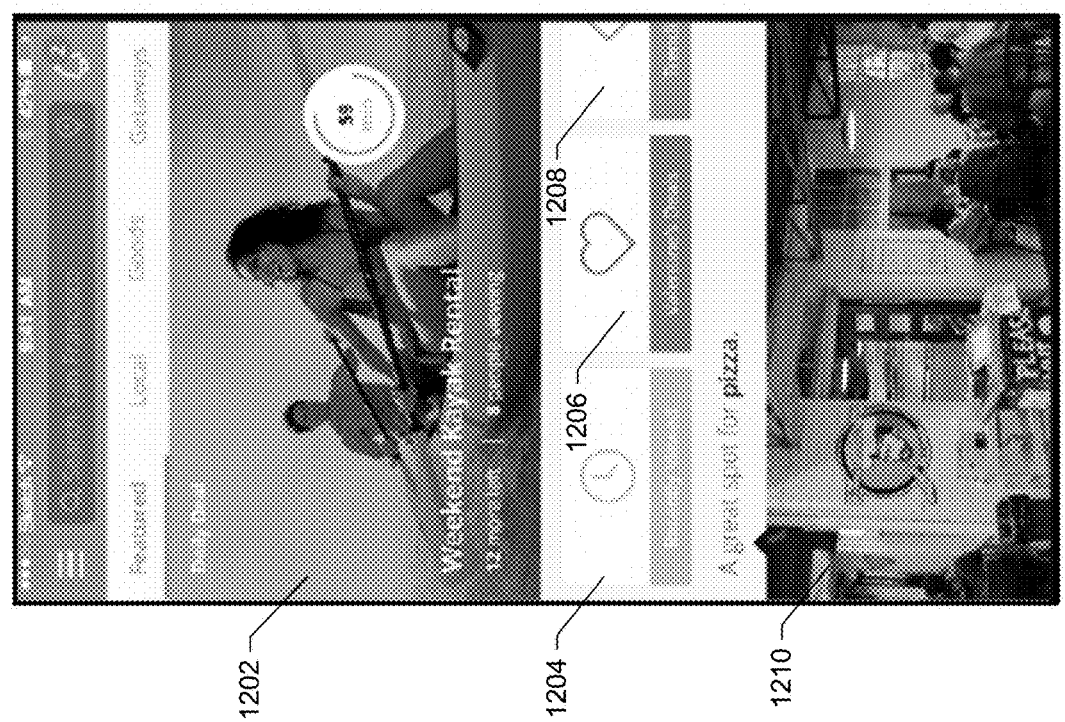
Figure 12D:
Figure 12C:

At 414, the one or more servers 104 may be configured to generate a mobile home interface based on the mobile card layout. FIGS. 12a-12d show examples of a mobile home interface 1200 in accordance with some embodiments. With reference to FIG. 12a, for example, mobile home interface 1200 may include cards 1202, 1204, 1206, 1208, and 1210. Similarly, various other card selections and car layouts are shown in FIGS. 12b-12d. The discussion at 318 of method 300 may be applicable at 414.

At 416, the one or more servers 104 may be configured to provide one or more of the candidate cards to the mobile home interface based on the card score ranking and the mobile card layout. The discussion at 320 of method 300 may be applicable at 416. For example, in some embodiments, the top N candidate cards may be selected for inclusion within a card layout including N card slots. Furthermore, in some embodiments, one or more of the cards may be scaled, rearranged, resized, or otherwise modified based on the size of the selected slot for the card. In another example, a card may include a slot size constraint, and thus may be placed in a suitable card slot that meets the slot size constraint.

Returning to 412, in response to determining that the consumer device is a desktop device, method 400 may proceed to 420, where the one or more servers 104 may be configured to determine a desktop card layout. At 422, the one or more servers 104 may be configured to generate a desktop home result interface based on the desktop card layout. The discussions at 322 and 324 of method 300 may be applicable at 420 and 422 respectively. FIGS. 13a and 13b show examples of a desktop home interface 1300 in accordance with some embodiments. In some embodiments, the promotion and marketing service may utilize common desktop card layouts for various desktop consumer interfaces, such as the desktop search result interface and the desktop home interface.

At 424, the one or more servers 104 may be configured to provide one or more of the candidate cards to the desktop home interface based on the card score ranking and the desktop card layout. With reference to FIG. 13a, desktop home interface 1300 may include a card layout region 1302 within which cards 1304 may be disposed within card slots of the mobile card layout as discussed herein. Method 400 may then proceed to 424 and end.

In some embodiments, consumer device input from a touch screen may be used to for consumer device interaction with the promotion and marketing system. FIG. 19 shows an example of a method 1900 for providing a mobile interface in accordance with some embodiments. The mobile interface allows for search parameter definition based on horizontal swiping, and for card layout browsing based on vertical swiping. However, it is appreciated that the horizontal and vertical functionalities can be changed. Furthermore, other types of consumer device inputs other than touchscreen inputs may also be used. For example, horizontal or vertical click and drags may be similarly leveraged for a desktop interface version.

Method 1900 may begin at 1902 and proceed to 1904, where the one or more servers 104 may be configured to connect with a consumer device via a network as discussed above. At 1906, the one or more servers 104 may be configured to provide a mobile interface to the consumer device. In some embodiments, the mobile interface may be provided in response to determining that the consumer device is a mobile device.

FIGS. 18a-h show an example of a mobile interface 1800 in accordance with some embodiments. Mobile interface 1800 may be provided to a consumer device 108 for interfacing with the promotion and marketing service, such as via a mobile application or mobile browser application.

At 1908, the one or more servers 104 may be configured to receive a first consumer device input indicating a horizontal swipe within the mobile interface. The first consumer device input may be generated by a touchscreen. Horizontal, as used herein, refers to swiping from the left to right, or from the right to left directions.

At 1910, the one or more servers 104 may be configured to determine search parameters based on the first consumer device input. With reference to FIG. 18a, mobile interface 1800 may include a home or feature interface including a menu 1802 and a mobile card layout region 1804. The mobile card layout region 1804 may be configured to present programmatically selected cards (e.g., based on electronic marketing information of a consumer) for presentation within the card slots of a mobile card layout as discussed above in method 400 and FIG. 4.

The menu 1802 may provide a top menu for the promotion and marketing service, and may allow consumers to access various interfaces discussed herein. For example, based on a horizontal swipe (e.g., left to right, or right to left) at the menu 1802 or the mobile card layout region 1804, the consumer device may navigate through the interfaces of the menu 1802 (e.g., Nearby, Featured, Goods, Getaways, Electronics, Entertainment, etc.). Here, each of the interfaces of the menu 180e represents browsing categories that define category search parameters.

Figure 18B:
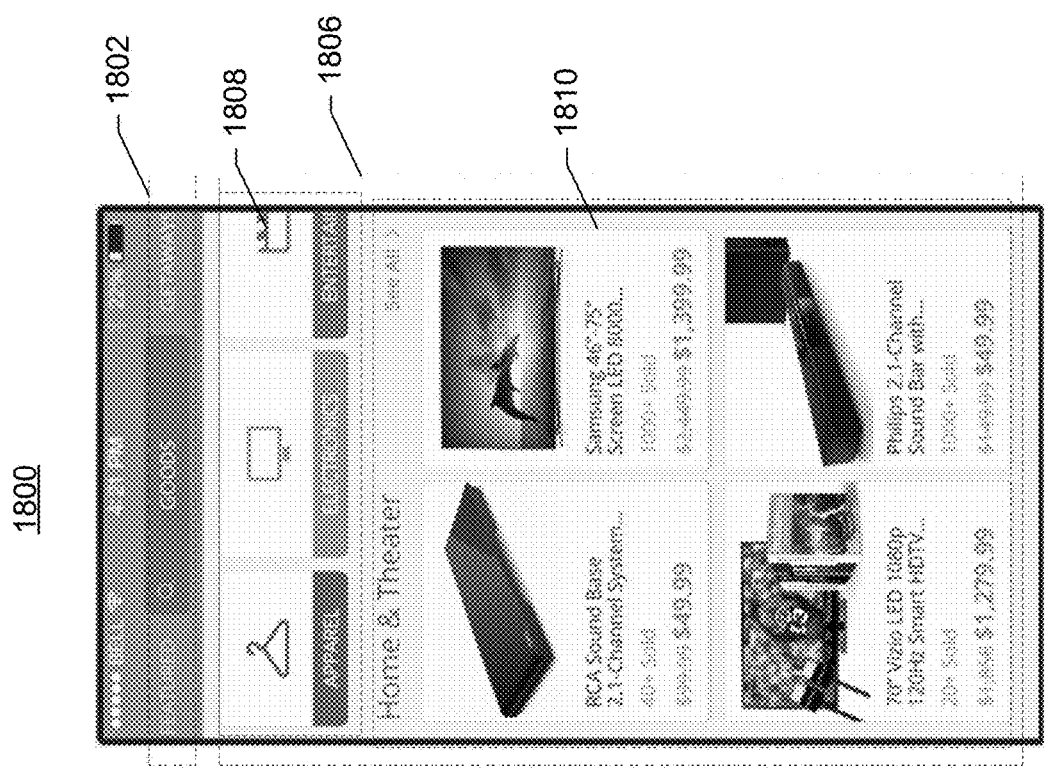
Figure 18A:
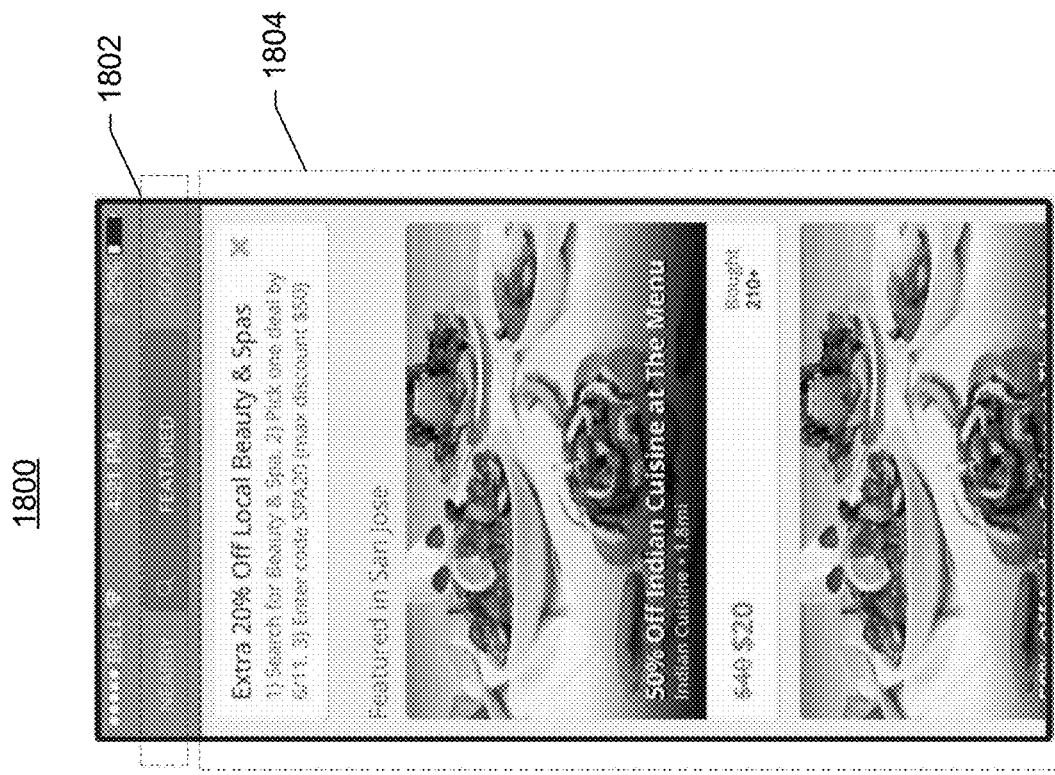

With reference to FIG. 18b, based on the consumer swiping from right to left (e.g., to push the mobile interface 1800 to the left), the mobile interface 1800 may present a goods browsing interface 1806. Furthermore, the menu 1802 may also be updated to indicate that the consumer is within the goods browsing interface 1806. Goods browsing interface 1806 may include goods category buttons 1808 and mobile card layout region 1810. Goods category buttons 1808 may include buttons providing for additional search parameter selection, such as filters for apparel, electronics, entertainment, etc.

At 1914, the one or more servers 104 may be configured to determine a plurality of card layouts. The plurality of card layouts may include a common card slot arrangement, or may include different card slot arrangements. With reference to FIG. 18b, for example, card layout region 1818 includes a card layout including four cards. Multiple card layouts may be selected, such as based on the consumer device type (e.g., mobile card layouts for mobile consumer devices).

At 1916, the one or more servers 104 may be configured to provide cards to the card slots of the plurality of card layouts. The discussion in methods 300 or 400 may be applicable at 1916 for populating card slots based on search parameters. Based on horizontal swiping at goods category buttons 1808 and/or the card layout region 1818, for example, the card layout region 1810 may be updated based on the selected category search parameter. Furthermore, the mobile interface 1800 may be configured to allow search query entry within the goods browsing interface 1806. The browsing menu selections and/or search terms may be provided as search parameters, and used to determine card scores and ranking for candidate cards, as discussed above in method 300 and FIG. 3. As such, card layout region 1810 may include cards selected based on the search parameters defined by the horizontal swiping, or first consumer device input.

At 1918, the one or more servers 104 may be configured to receive a second consumer device input indicating a vertical swipe. The second consumer device input may be generated by a touchscreen. Vertical, as used herein, refers to swiping from the top to bottom, or from the bottom to top directions.

Figure 18D:
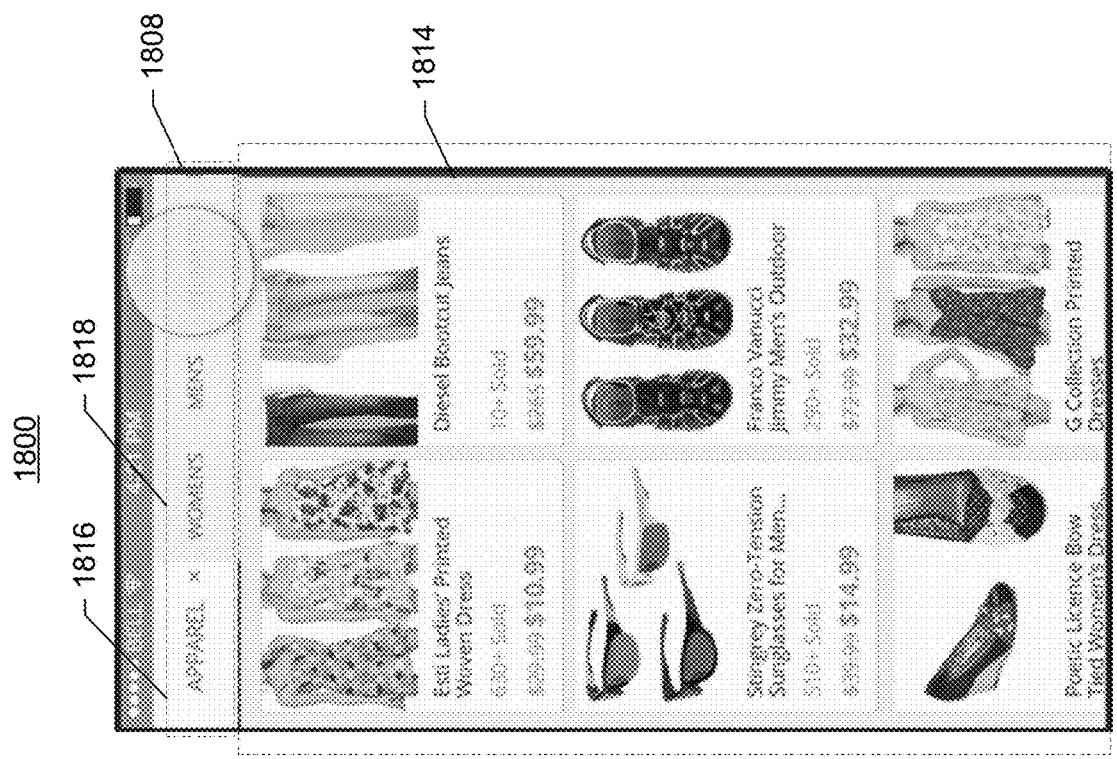
Figure 18C:
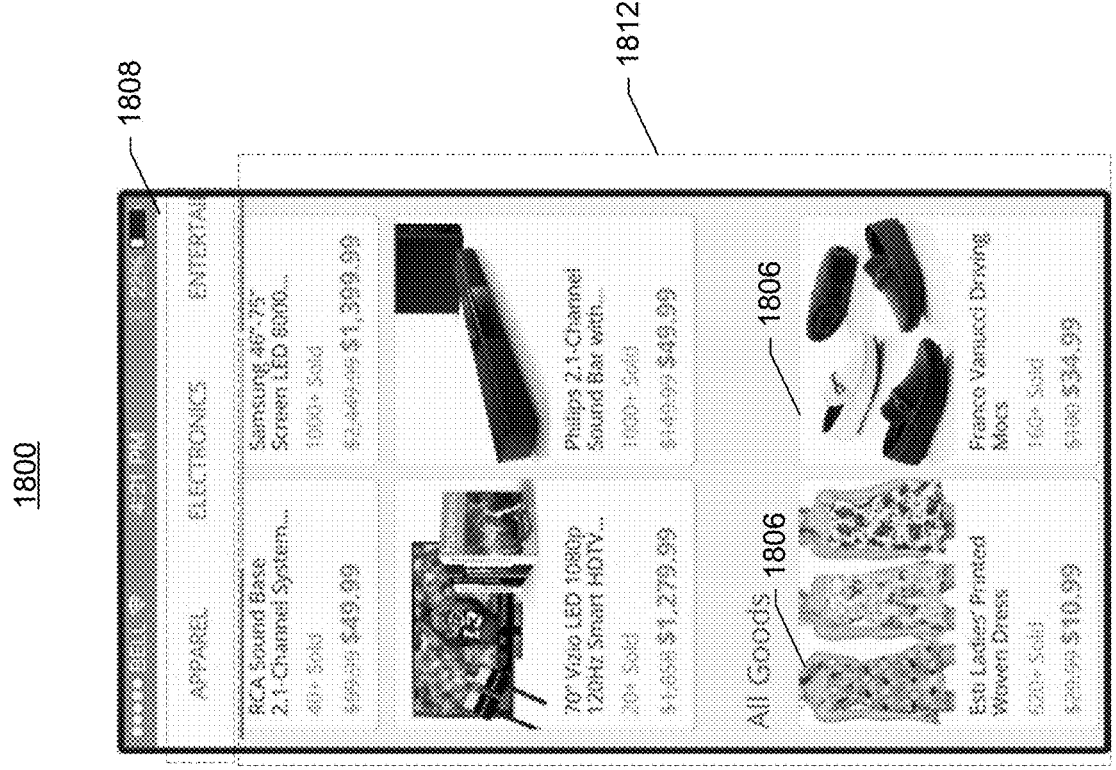

At 1920, the one or more servers 104 may be configured to provide one of the card layouts to the mobile interface based on the second consumer device input. For example, based on the consumer swiping from top to bottom, or bottom to top, the mobile interface 1800 may be configured to allow scrolling through a card layout, or scrolling across the plurality of card layouts. The plurality of card layouts may have the same arrangement of card slots, or may include different arrangements. With reference to FIGS. 18b and 18c, based on the consumer swiping down in the mobile interface 1800 (e.g., at menu 1802 and/or goods browsing interface 1806), the card layout may scroll down as shown in FIG. 18c, thereby revealing additional cards 1812 of the same card layout within the card layout region 1810. Furthermore, the category buttons 1808 may be moved to the top of the mobile interface 1800, and the menu 1802 may be moved off screen or otherwise removed from the mobile interface 1800. Similarly, based on the consumer swiping up in the mobile interface 1800, the card layout region 1810 may scroll up, the category buttons 1808 may return to the goods browsing interface 1806, and the menu 1802 may return to the mobile interface 1800, as shown in FIG. 18b.

In some embodiments, horizontal and vertical swipes may be received in various orders and/or on a repeated basis for further search parameter definition and/or search result browsing. Based on the consumer selecting swiping horizontally within the category buttons 1808, the card layout region 1810 may be updated to include cards associated with the selected category. For example and with reference to FIG. 18c, based on the consumer swiping from left to right, an apparel browsing interface 1814 may be presented to the mobile interface 1800 as shown in FIG. 18d. Here, the apparel category may be used as a search parameter for card selection as discussed above to populate the apparel browsing interface 1814.

Figure 18F:
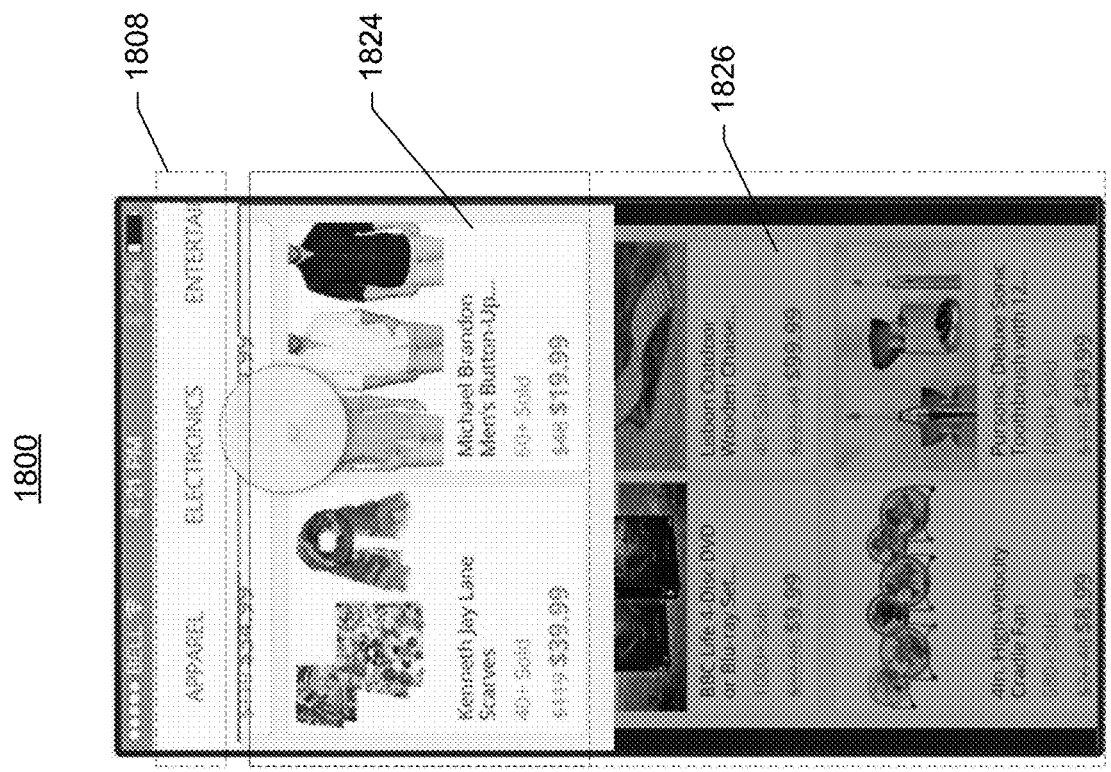
Figure 18E:
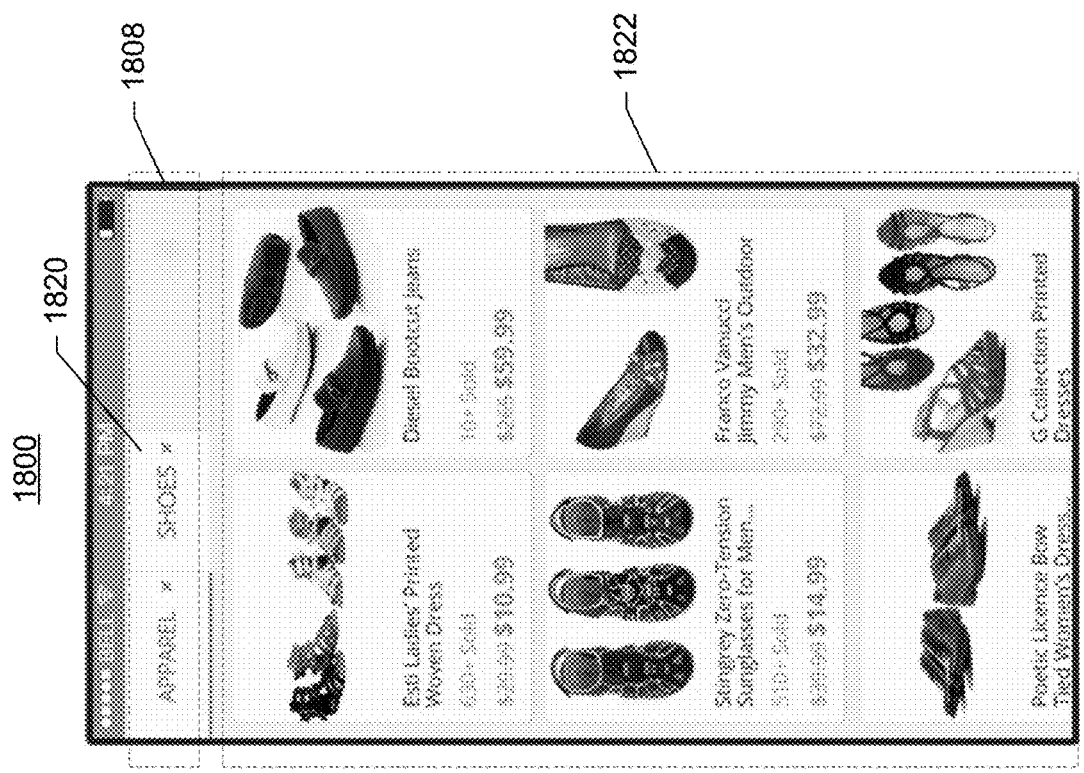

Furthermore, the category buttons 1808 may be configured to provide for subcategories where appropriate. For example, selection of the apparel category 1816 shown in FIG. 18d may result in the presentation of subcategory buttons 1818 (e.g., women's, men's, intimates, shoes, etc.). As shown in FIG. 18e, selection of a shoe subcategory button 1820 may result in a shoe browsing interface 1822. Here, the shoe and apparel may be used as a search parameter for card selection as discussed above to populate the shoe browsing interface 1822. Similarly, the mobile interface may allow consumers to navigate backwards through the subcategories and categories, such as by tapping a selected category or subcategory button. For example, based on consumer device input indicating a tap on shoes button 1820, the mobile interface may return to the higher level apparel browsing interface 1814 as shown in FIG. 18d. Furthermore, the category buttons 1808 may be updated to indicate the subcategories of the apparel category. In some embodiments, subcategories may include additional subcategories (e.g., shoe types for the shoe subcategory). Such subcategories of subcategories may be browsed in the same manner as discussed herein between category and subcategory.

In some embodiments, cards may be presented to the mobile interface (or a desktop interface), in the form of discrete card layouts or pages. As shown in FIG. 18f, based on the consumer swiping vertically, mobile card layout 1824 may be pushed up, revealing mobile card layout 1826. In some embodiments, the one or more servers 104 may be configured to populate multiple mobile card layouts based on the card scores and/or rankings. For example, for particular search parameters, the top N ranking candidate cards may be selected to populate the multiple mobile card layouts that include a total of N card slots cumulatively. In some embodiments, where a mobile card layout is larger than the screen size or card layout region, vertical scrolling may also provide for scrolling within a single mobile card layout. For example, based on a slow swipe and/or short swipe, the mobile interface 800 may scroll a mobile card layout, while a fast swipe and/or long swipe, the mobile interface 800 may move to a second mobile card layout. In some embodiments, mobile card layouts may be ordered for forward and backward scrolling through the multiple mobile card layouts, such as by swiping up for forward scrolling (e.g., from mobile card layout 1824 to mobile card layout 1826) and swiping down for backward scrolling (e.g., from mobile card layout 1826 to mobile card layout 1824).

Figures 18G, 18H:
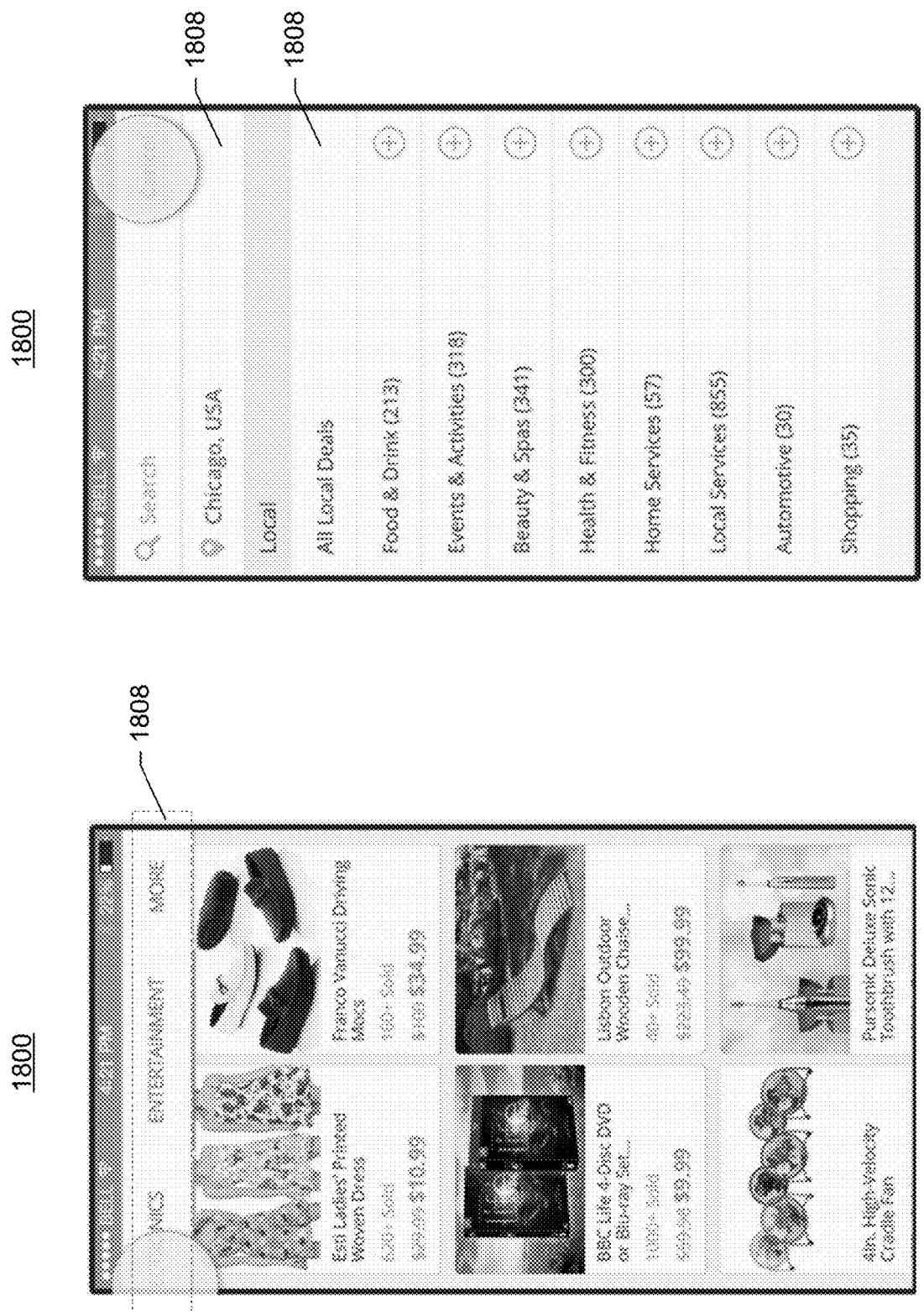

With reference to FIG. 18g, additional category buttons 1808 may be exposed based on horizontal swiping, such as the entertainment and more category buttons. Based on selection of the more category button 1808, additional browsing options and/or search parameter filters 1808 may be provided to the mobile interface 1800. FIG. 23 shows additional examples of mobile interfaces 2300 in accordance with some embodiments. Method 1900 may then proceed to 1922 and end.

Inspirational Navigation

Some embodiments may provide improved consumer interface navigation. For example, the promotion and marketing service may be configured to provide navigation interfaces that allow for browsing of the candidate cards and/or items. In some embodiments, the promotion and marketing service may be configured to support inspirational item browsing based on item collections or themes (e.g., in addition or alternative to browsing based on categories).

FIG. 14 shows an example of a navigation interface 1400 in accordance with some embodiments. Navigation interface 1400 may include a menu 1402, which may include item category/type buttons for browsing based on item category/type. In some embodiments, menu 1402 may further include an inspirational browsing button 1406. In response to consumer device input selecting inspirational browsing button 1406, the one or more servers 104 may be configured to provide inspirational browsing menu 1408. Inspiration browsing menu may include items that are arranged based on "collections." As shown at 1410, some example collections may include "Good for Kids," "Spring Break," "Gadgets+Gear," "Weddings," and "Romantic getaways." FIG. 15 shows an example of a browsing interface 1500 in accordance with some embodiments. The browsing interface 1500 shows an example of items that are arranged based on "themes." As shown at 1502, some example themes may include "Healthy Living," Well-Groomed," etc. Other examples of themes or collections may include outdoor adventures, date night, pampering, ski vacation, etc. FIG. 16 shows an example of a browsing interface 1600 in accordance with some embodiments. The browsing interface 1600 shows an example of item categories that are arranged based on "categories." As shown at 1602, some example categories may include "Food & Drink," "Electronics," "Hotels and Vacations," etc. Other examples of themes or collections may include outdoor adventures, date night, pampering, ski vacation, etc.

Some embodiments may provide for techniques for associating items with themes or collections. FIG. 17 shows an example of a navigation sorting interface 1700 in accordance with some embodiments. The navigation sorting interface 1700 is another example of a consumer interface that may be provided to the consumer device. The navigation sorting interface 1700 may be configured to facilitate consumer association of items/cards with themes/collections. In some embodiments, the one or more servers may provide the navigation sorting interface 1700 to consumer devices as a form of "crowd sourcing" for consumer item associations. As such, navigation menus generated using the navigation sorting interface 1700 may be more intuitive or otherwise in line with consumer expectations.

The navigation sorting interface 1700 may include item/card collection 1702, and one or more theme/collection buckets, such as beauty bucket 1704 and food bucket 1606. Item collection 1702 may include a plurality of items/cards 1708 which may be taken from the item collection 1702 and placed into a suitable theme/collection bucket. Based on the assignment of item/cards 1708 to the various buckets, the one or more servers 104 may be configured to quantitatively assess which types of items/cards go together, and may further associate such items/cards with themes/collections. As such, the associated items or cards may be provided the consumer device in response to the consumer browsing and navigating the associated theme/collection.

Advanced Browsing

Some embodiments may provide for use-case related browsing paths, better in-situ sorting and filtering without reloading a page or interface screen, category-specific browsing functionality, among other things.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising one or more servers configured to:
connect with a consumer device via a network;
transmit a search interface to the consumer device;
receive one or more search parameters from the consumer device via the network;
determine card scores for candidate cards based on the one or more search parameters, wherein each candidate card includes an electronic marketing message indicating one or more items, wherein a card score for a candidate card is based upon a plurality of user-item relevance scores, wherein each user-item relevance score of the plurality of user-item relevance scores is calculated using a scoring function and for each item of the one or more items and specific to a given consumer account associated with the consumer device, and wherein each item of the one or more items comprises an item type;
determine a card score ranking based on the card scores, a first item type and a first scoring function that applies weights based on a conversion rate estimate representative of a probability that a given user is going to make a purchase;
determine a card score co-ranking based on the card scores, the first item type, and a second scoring function that applies weights based on an inventory level representative of a number of instances available for acceptance by the given user; and
in response to determining that the consumer device is a mobile device:
determine a mobile card layout based on a type and screen size of the mobile device;
generate a mobile interface based on the mobile card layout, wherein the mobile interface is optimized for the type and screen size of the mobile device;
add one or more of the candidate cards to the mobile interface based on the mobile card layout and a card placement sequence comprising the one or more of the candidate cards arranged according to position-adjusted conversion rates determined based at least in part on the card score ranking and the card score co-ranking, wherein the position-adjusted conversion rates are configured to adjust a placement of the one or more of the candidate cards to reduce a likelihood of a sold-out experience for the given user; and
transmit the mobile interface to the consumer device for display by the consumer device.

2. The system of claim 1, wherein the one or more servers are further configured to, in response to determining that the consumer device is a mobile device:
determine a plurality of mobile card layouts; and
add candidate cards to card slots of the plurality of card layouts based on the card score ranking.

3. The system of claim 2, wherein the one or more servers are further configured to: receive a consumer device input indicating a vertical swipe within the mobile interface; and provide one of the plurality of mobile card layouts to the mobile interface based on the consumer device input.

4. The system of claim 1, wherein the one or more servers configured to receive the one or more search parameters from the consumer device via the network includes the one or more servers being configured to receive a first consumer device input indicating a horizontal swipe within the mobile interface, the horizontal swipe defining the one or more search parameters.

5. The system of claim 4, wherein the one or more servers are further configured to, in response to determining that the consumer device is a mobile device:
determine a plurality of mobile card layouts;

provide candidate cards to card slots of the plurality of card layouts based on the card score ranking;

receive a second consumer device input indicating a vertical swipe within the mobile interface;

provide one of the plurality of mobile card layouts to the mobile interface based on the second consumer device input; and transmit the mobile interface to the consumer device.

6. The system of claim 1, wherein the one or more servers are further configured to:

identify the given consumer account associated with the consumer device and associated electronic marketing information; and determine the card scores for the candidate cards based on the associated electronic marketing information.

7. The system of claim 1, wherein the one or more search parameters comprises one or more of a search term, a location, or an item category.

8. The system of claim 1, wherein the mobile card layout is scaled to one or more dimensions of the screen size of the consumer device such that one or more entire dimensions of the mobile card layout are visible within the mobile interface.

9. The system of claim 1, wherein each candidate card includes presentation data including at least one of text, image, or video data.

10. The system of claim 1, wherein the one or more servers are further configured to:

connect with a second consumer device via the network;

identify a second consumer account and electronic marketing information associated with the second consumer device;

determine second card scores for the candidate cards based on the electronic marketing information, wherein a second card score for a candidate card is based upon a second plurality of user-item relevance scores, each user-item relevance score of the plurality of user-item relevance scores calculated using a scoring function, and each user-item relevance score of the plurality of user-item relevance scores calculated for each item of the one or more items and specific to the second consumer account associated with the second consumer device;

determine a second card score ranking based on the second card scores;

determine whether the second consumer device is a mobile device; and in response to determining that the second consumer device fails to be a mobile device:

determine a desktop card layout based on a type of the second consumer device;

generate a desktop interface based on the desktop card layout, wherein the desktop interface is optimized based on a screen size of the second consumer device;

add one or more of the candidate cards to the desktop interface based on the second card score ranking and the desktop card layout; and transmit the desktop interface to the second consumer device for display by the second consumer device.

11. The system of claim 1, wherein the scoring function is executed in a distributed search cluster.

12. The system of claim 1, wherein the scoring function calculates the user-item relevance score based upon one or more of expected revenue, a conversion rate estimate representative of a probability that the given consumer account will make a purchase associated with the item, clickstream data, or consumer information associated with the given consumer account.

13. The system of claim 12, wherein the consumer information comprises one or more of preferences, interest, group membership, hobbies, characteristics, or age.

14. The system of claim 12, wherein the scoring function applies weights to factors including one or more of expected conversion, freshness, or inventory levels.

15. The system of claim 1, wherein the mobile device comprises a wearable device.

16. The system of claim 1, wherein the mobile interface is configured to accept one or more gesture inputs characterized by a rate or a length.

17. The system of claim 1, wherein the card score ranking and the card score co-ranking are further determined based on at least a second item type.

18. The system of claim 17, wherein the first item type comprises one or more of a promotion, a product, or a getaway, and wherein the second item type comprises a gift card associated with the first item type.

19. A method for providing a mobile interface, comprising:

connecting with a consumer device via a network by one or more servers;

transmitting, by the one or more servers, a search interface to the consumer device;

receiving, by the one or more servers, one or more search parameters from the consumer device via the network;

determining, by the one or more servers, card scores for candidate cards based on the one or more search parameters, wherein each candidate card includes an electronic marketing message indicating one or more items, wherein a card score for a candidate card is based upon a plurality of user-item relevance scores, wherein each user-item relevance score of the plurality of user-item relevance scores is calculated using a scoring function and for each item of the one or more items and specific to a given consumer account associated with the consumer device, and wherein each item of the one or more items comprises an item type;

determining, by the one or more servers, a card score ranking based on the card scores, a first item type, and a first scoring function that applies weights based on a conversion rate estimate representative of a probability that a given user is going to make a purchase;

determining, by the one or more servers, a card score co-ranking based on the card scores, the first item type, and a second scoring function that applies weights based on an inventory level representative of a number of instances available for acceptance by the given user; and in response to determining that the consumer device is a mobile device, and by the one or more servers:

determining a mobile card layout based on a type and screen size of the mobile device;

generating a mobile interface based on the mobile card layout, wherein the mobile interface is optimized for the type and screen size of the mobile device;

adding one or more of the candidate cards to the mobile interface based on the mobile card layout and a card placement sequence comprising the one or more of the candidate cards arranged according to position-adjusted conversion rates determined based at least in part on the card score ranking and the card score co-ranking, wherein the position-adjusted conversion rates are configured to adjust a placement of the one or more of the candidate cards to reduce a likelihood of a sold-out experience for the given user; and transmitting the mobile interface to the consumer device for display by the consumer device.

20. The method of claim 19 further comprising, in response to determining that the consumer device is a mobile device, and by the one or more servers:
   determining a plurality of mobile card layouts; and
   adding candidate cards to card slots of the plurality of card layouts based on the card score ranking.

21. The method of claim 20, further comprising, by the one or more servers:
   receiving a consumer device input indicating a vertical swipe within the mobile interface; and providing one of the plurality of mobile card layouts to the mobile interface based on the consumer device input.

22. The method of claim 19, wherein receiving the one or more search parameters from the consumer device via the network includes receiving a first consumer device input indicating a horizontal swipe within the mobile interface, the horizontal swipe defining the one or more search parameters.

23. The method of claim 22, further comprising, in response to determining that the consumer device is a mobile device:
   determining a plurality of mobile card layouts;
   providing candidate cards to card slots of the plurality of card layouts based on the card score ranking;
   receiving a second consumer device input indicating a vertical swipe within the mobile interface; and
   providing one of the plurality of mobile card layouts to the mobile interface based on the second consumer device input.

24. The method of claim 19 further comprising, by the one or more servers:
   identifying the given consumer account and associated electronic marketing information associated with the consumer device; and
   determining the card scores for the candidate cards based on the electronic marketing information.

25. The method of claim 19, wherein the one or more search parameters comprises one or more of
   a search term,
   a location, or
   an item category.

26. The method of claim 19, wherein the mobile card layout is scaled to one or more dimensions of the screen size of the consumer device such that one or more entire dimensions of the mobile card layout are visible within the mobile interface.

27. The method of claim 19, wherein each candidate card comprises presentation data comprising at least one of text, image, or video data.

28. The method of claim 19 further comprising, by the one or more servers:
   connecting with a second consumer device via the network;
   identifying a second consumer account and electronic marketing information associated with the second consumer device;
   determining second card scores for the candidate cards based on the electronic marketing information, wherein a second card score for a candidate card is based upon a second plurality of user-item relevance scores, each user-item relevance score of the plurality of user-item relevance scores calculated using a scoring function, and each user-item relevance score of the plurality of user-item relevance scores calculated for each item of the one or more items and specific to the second consumer account associated with the second consumer device;
   determining a second card score ranking based on the second card scores;
   determining whether the second consumer device is a mobile device; and
   in response to determining that the second consumer device fails to be a mobile device:
      determining a desktop card layout based on a type of the second consumer device;
      generating a desktop interface based on the desktop card layout, wherein the desktop interface is optimized based on a screen size of the second consumer device;
      adding one or more of the candidate cards to the desktop interface based on the second card score ranking and the desktop card layout; and
      transmitting the desktop interface to the second consumer device for display by the second consumer device.

* * * * *